(12) United States Patent
Asada et al.

(10) Patent No.: US 6,246,503 B1
(45) Date of Patent: Jun. 12, 2001

(54) OPTICAL BARRIER APPARATUS

(75) Inventors: Norihiro Asada, Shouwa-machi; Koichi Futsuhara, Oomiya, both of (JP)

(73) Assignee: Nihon Shingo Kabushiki Kaisha (JP)

(*) Notice: Subject to any disclaimer, the term of this patent is extended or adjusted under 35 U.S.C. 154(b) by 0 days.

(21) Appl. No.: 09/538,415

(22) Filed: Mar. 30, 2000

Related U.S. Application Data

(62) Division of application No. 08/930,077, filed as application No. PCT/JP97/00742 on Mar. 10, 1997, now Pat. No. 6,046,834.

(30) Foreign Application Priority Data

Mar. 8, 1996 (JP) ........................................ 8-51768

(51) Int. Cl.⁷ .................................................. G02B 26/08
(52) U.S. Cl. ........................ 359/196; 359/224; 250/230; 250/234
(58) Field of Search .................... 359/196, 197, 359/223, 224; 250/230, 234, 235, 236

(56) References Cited

U.S. PATENT DOCUMENTS

| | | | |
|---|---|---|---|
| 3,809,891 | 5/1974 | Erdman et al. | 250/222 R |
| 4,239,961 * | 12/1980 | Lasar | 250/221 |
| 4,757,417 | 7/1988 | Futsuhara | 361/86 |
| 4,855,608 | 8/1989 | Peterson, II | 250/560 |
| 5,629,790 * | 5/1997 | Neukermans et al. | 359/198 |

FOREIGN PATENT DOCUMENTS

| | | |
|---|---|---|
| 196 04 337 A1 | 8/1997 | (DE). |
| 58-147671 | 9/1983 | (JP). |
| 63-34962 | 7/1988 | (JP). |
| 63-273031 | 11/1988 | (JP). |
| 2-257114 | 10/1990 | (JP). |
| 560993 | 3/1993 | (JP). |
| 8220453 | 8/1996 | (JP). |
| 9323772 | 11/1993 | (WO). |
| 9423303 | 10/1994 | (WO). |
| 9423496 | 10/1994 | (WO). |
| 9510789 | 4/1995 | (WO). |

OTHER PUBLICATIONS

Hiroshi Goto and Koichi Imanaka, "Super compact dual axis optical scanning unit applying a tortional spring resonator driven by a piezoelectric actuator," SPIE vol. 1544 Miniature and Micro–Optics: Fabrication and System Applications (1991), pp 272–281.

* cited by examiner

*Primary Examiner*—Darren Schuberg
(74) *Attorney, Agent, or Firm*—Gifford, Krass, Groh, Sprinkle, Anderson & Citkowski, P. C.

(57) ABSTRACT

A laser beam generated from a laser beam generating means 201 is reflected on a semiconductor mirror galvanometer 102. A region 105 to be inspected is scanned with the reflected laser beam 106. The laser beam 106 passing through the region 105 to be inspected is received by a light receiving device array 130. A pulse train included in an output signal produced from the light receiving device array 130 are monitored by a signal processing circuit 206. If an obstacle introduces into the region 105 to be inspected and induces a pulse deficiency in the pulse train, the deficiency is detected by use of a pulse deficiency detecting circuit 204. A constitution mentioned above provides an optical barrier apparatus capable of reducing manufacturing costs without endangering a fail-safe property.

3 Claims, 20 Drawing Sheets

VIEW SHOWING CONSTITUTIONS OF EMBODIMENT 3

VIEW SHOWING CONSTITUSIONS AND OPERATIONS OF EMBODIMENT 1

VIEW SHOWING CONSTITUTIONS OF EMBODIMENT 2

FIG.4 BLOCK DIAGRAMS SHOWING LIGHT RECEIVING DEVICE ARRAY AND SIGANL PROCESSING C CIRCUIT IN EMBODIMENT 2

FIG.5
TIMING CHART OF SIGNAL PROCESSING CIRCUIT IN EMBODIMENT 2
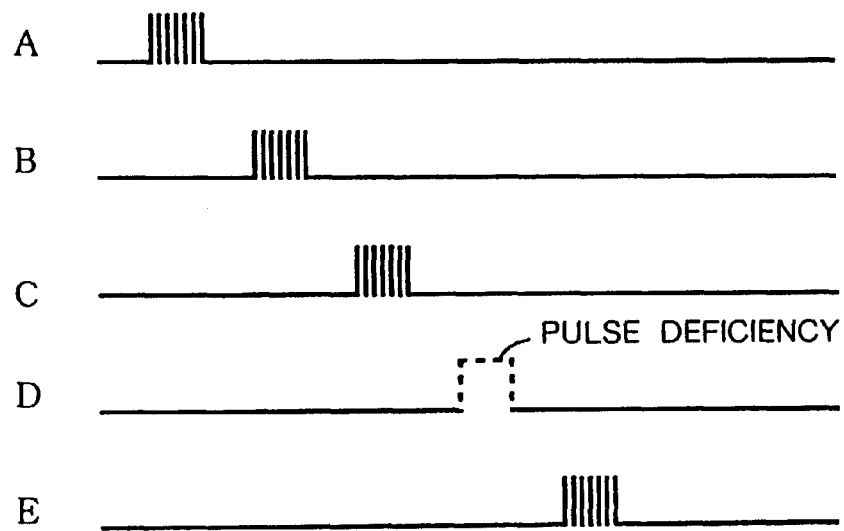
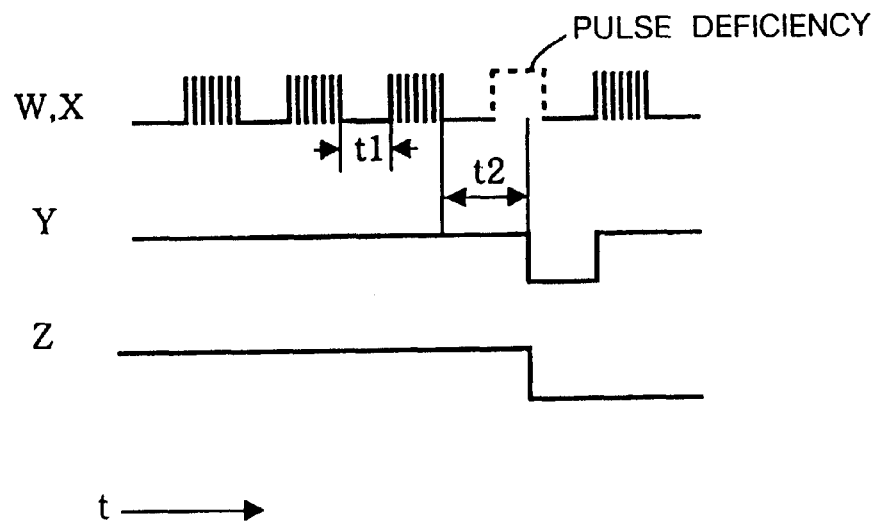

BLOCK DIAGRAM OF SIGNAL PROCESSING CIRCUIT IN EMBODIMENT 3

TIMING CHART OF SIGNAL PROCESSING CIRCUIT IN EMBODIMENT 3

VIEW SHOWING CONSTITUTIONS OF SCANNING CONFIRMATION PART IN EMBODIMENT 3

BLOCK DIAGRAM OF CONFIRMING PART FOR SCANNING OPERATION IN EMBODIMENT 3

SIGNAL PROCESSING CIRCUIT FOR CONFIRMING SCANNING OPERATION

TIMING CHART OF CONFIRMING PART FOR SCANNING OPERATION IN EMBODIMENT 3

BLOCK DIAGRAM OF OUTPUT SIGNAL GENERATING PART IN EMBODIMENT 3

EXPLODED PERSPECTIVE VIEW OF SEMICONDUCTOR MIRROR GALVANOMETER

GRAPH SHOWING AN EXAMPLE OF OPERATIONAL CHARACTERISICS OF SEMICONDUCTOR MIRROR GALVANOMETER

VIEW SHOWING CONSTITUTION OF SEMICONDUCTOR MIRROR GALVANOMETER

LONGITUDINAL SECTION VIEW TAKEN ALONG A–A OF FIG.15

ILLUSTRATION OF OPERATION IN SEMICONDUCTOR MIRROR GALUVANOMETER

VIEW ILLUSTRATING DISPLACEMENT ANGLE DETECTION OF SEMICONDUCTOR MIRROR GALUVANOMETER

OUTPUT SIGNAL FOR DETECTING DISPLACEMENT ANGLE

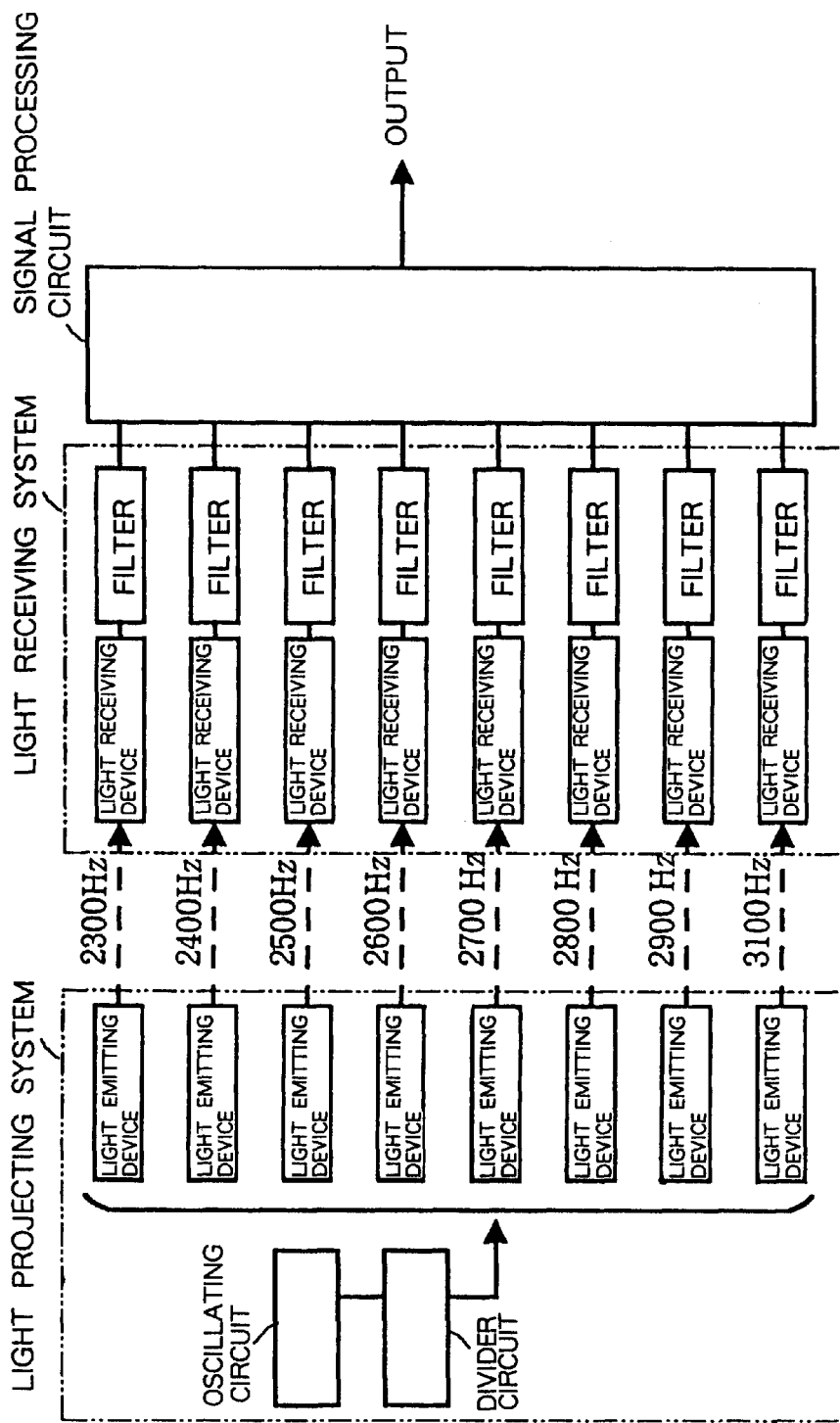

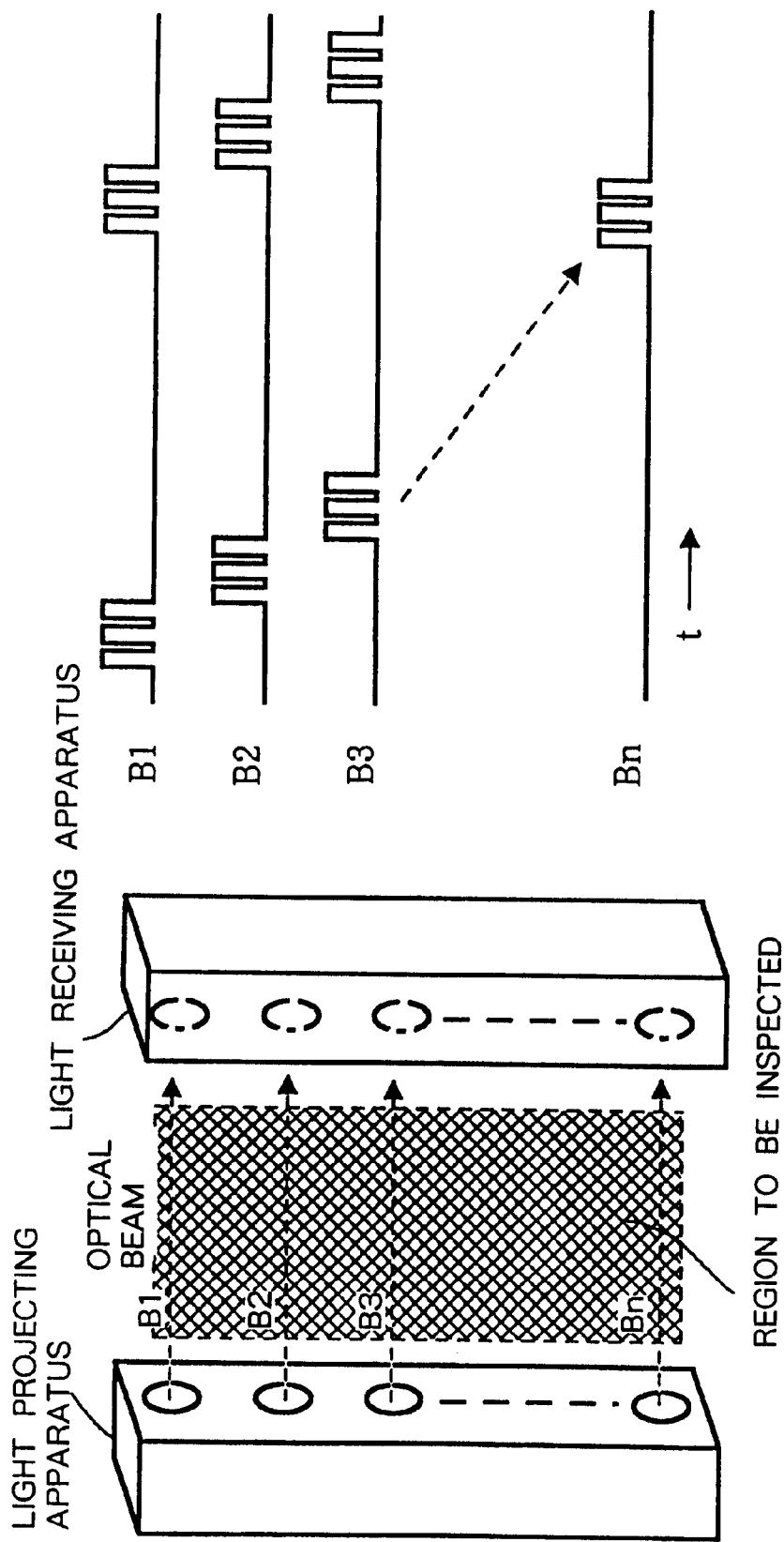
FIG.25 VIEW ILLUSTRATING CONVENTIONAL EXAMPLE 2

OPTICAL BARRIER APPARATUS

CROSS-REFERENCE TO RELATED APPLICATIONS

This application is a divisional of U.S. patent application Ser. No. 08/930,077 filed Nov. 7, 1997 now U.S. Pat. No. 6,046,834, which is a 371 of PCT/JP97/00742 filed Mar. 10, 1997 now U.S. Pat. No. 6,046,834.

BACKGROUND OF THE INVENTION

1. Field of the Invention

The present invention relates to an optical barrier apparatus (which is so called "an optical barrier sensor") such as used for industrial security equipment and so on.

2. Brief Description of the Prior Art

An optical barrier apparatus is basically composed of a pair of a light projector and a combined light receiver. The apparatus is to detect an absence of substance between the light projector and the light receiver by sensing that an optical beam projected from the light projector is directly incident to the light receiver. Patents concerning fail-safe optical barrier sensors include PCT International Publication Numbers WO93/23772 and WO95/10789 and are well-known.

If any apparatus is utilized as industrial security equipment, the apparatus has to have a fail-safe constitution. Accordingly, the apparatus is constituted so as to transmit an output signal indicating the absence of the substance only when the optical beam arrives at the light receiver. On the contrary, the apparatus is constituted so as to propagate another output signal for indicating the existence of a substance when the substance actually exists between the light projector and the light receiver as well as when any failure arises in the apparatus.

One light projector and one combined light receiver is sufficient for detecting the existence of the substance in some cases. However, there are many cases wherein the region to be monitored should be broadened. Those cases are investigated below.

A first procedure to be considered is to broaden the region to be detected by employing plural pairs of the light projectors and the light receivers. In order not to endanger the fail-safe property of the system during broadening, each pair, composed of one light projector and one light receiver, should project and receive only one optical beam modulated with a certain specified frequency to avoid an interference with other optical beams. An optical barrier apparatus fabricated according to this first procedure is illustrated as Conventional Example 1 as shown in FIG. 24.

A second procedure to be considered is to scan the region to be inspected with the lights to detect whether the substance is present or not by sensing the cut-off status of the optical beams. An optical barrier apparatus, wherein the fail-safe property is maintained by a use of this second procedure, is illustrated as Conventional Example 2 as shown in FIG. 25. The light projections and the light receivers are constituted to be operated synchronously to avoid interferences while the region to be inspected is scanned with the optical beams which are irradiated sequentially from B1 to Bn.

In an asynchronous type sensor, such as aforementioned Conventional Example 1, many sorts of band-pass filters having different passing frequencies differing from each other are required so the manufacturing cost is high because of an increase in species number of components. Although the resolution in the detecting system is decided by the physical alignment pitch of the light projectors and the light receivers, the alignment pitch cannot be reduced much. LEDs (light emitting diodes) are usually employed as the light projectors because they are the most economical when many light projectors are required. The rays of light emitted from the LED diverge, unlike a laser beam. Accordingly, to converge the rays of light emitted from the LED into one optical beam requires a lens. The light receiver also requires a lens for collecting the rays of light, which cannot shrink the alignment pitch. These lenses account for a major part of the manufacturing costs and therefore a reduction in manufacturing costs of this type of equipment is difficult. Further, because the diameter of the lens is preferably large to improve the optical disturbance-induced S/N ratio. Detection of a signal light generated from the light projector is impossible if the optical power of ambient light is more intense than that of the signal light projected from the light projector. A poor S/N ratio makes it impossible to carry out the system into practice. Consequently, a certain minimum aperture for the lens is necessary, which adversely effects the resolution of a target.

In the synchronous type sensor, such as shown in aforementioned Conventional Example 2, it is designed such that an output signal is not generated if the synchronous circuit fails. This approach is intended to attain the fail-safe characteristics but renders the circuitry complex. Namely, employing only one sort of band-pass filter reduces the manufacturing cost but the fail-safe synchronous circuit greatly increases the manufacturing costs. Alternatively, a great number of pairs composed of the light projectors and the light receivers may be used in a time-sharing manner but this approach includes the same defects as those the asynchronous type has. Namely, the resolution decided by the aperture of the lens has a certain limitation while the number of components, such as lenses, is so high that any reduction in manufacturing cost remains difficult.

SUMMARY OF THE INVENTION

The present invention is carried out in the circumstances mentioned above. An object of the present invention is to provide an optical barrier apparatus wherein the manufacturing cost may be reduced without endangering the fail-safe characteristics.

To satisfy the above-mentioned purposes, the present invention provides an optical barrier apparatus with a constitution: comprising a generating means of a laser beam; a laser scanning means which reflects the laser beam generated from the generating means so that an area including a region to be inspected is scanned with the laser beam; a light receiving device array which receives the laser beam incident from the laser scanning means through the area including the region to be inspected; and a detecting means of a deficiency in an output signal produced from the light receiving device array.

By constituting the optical barrier apparatus as mentioned above, the present invention can scan the area including the region to be inspected with the laser beam having an excellent directivity during projection and can assuredly grasp whether an obstacle such as a hand is present or not present within the region to be monitored by using the detecting means of the deficiency in output signal produced from the light receiving device array.

The present invention also provides an optical barrier apparatus with another constitution: comprising a generating means of a laser beam; a laser scanning means which reflects the laser beam generated from the generating means so that an area including a region to be inspected is scanned with the laser beam; a concave reflection mirror which reflects the laser beam incident from the laser scanning means through the area including the region to be inspected; a light receiving device array which receives the laser beam reflected from the concave reflection mirror and incident through the area including the region to be inspected; and a signal deficiency detecting means which detects a deficiency in output signal produced from the light receiving device array.

By constituting the apparatus so that the concave reflection mirror reflects the laser beam, the present invention enables the optical barrier apparatus to efficiently detect anomalies.

Furthermore, the present invention provides an optical barrier apparatus with still another constitution; comprising a generating means of a laser beam; a laser scanning means which reflects the laser beam generated from the generating means so that an area including a region to be inspected is scanned with the laser beam; a concave reflection mirror which reflects the laser beam incident from the laser scanning means through the area including the region to be inspected; a light receiving device which receives the laser beam reflected from the concave reflection mirror and incident through the area including the region to be inspected; and a signal deficiency detecting means of a deficiency in output signal produced from the light receiving device.

Next, the present invention provides a aforementioned constitutions with a different configuration: further comprising a light receiving device in use for confirming a scanning operation which is provided inside the area including the region to be inspected and located outside the region to be inspected; a signal deficiency detecting means in use for confirming the scanning operation which detects a deficiency in output signal produced from the light receiving device in use for confirming the scanning operation; and a means thereby blocking an output signal produced from the optical barrier apparatus when the signal deficiency detecting means detects the signal deficiency.

Moreover, the present invention provides abovementioned constitutions with another different configuration, wherein the laser scanning means is a semiconductor mirror galvanometer: comprising a movable plate monolithically formed in a semiconductor substrate; a torsion bar monolithically formed in the semiconductor substrate which axially supports the movable plate on the semiconductor substrate, allowing the movable plate freely to swing and to rock with respect to the semiconductor substrate; a driving coil formed on a periphery of the movable plate; a generating means of a magnetic field which applies a static magnetic field to the driving coil; and a mirror formed on the movable plate; wherein a current introduced to flow through the driving coil generates a force to move the movable plate in response to the force to vary an orienting direction of an optical axis of the mirror.

Then the present invention provides an optical barrier apparatus with further still another constitution: comprising a generating means of a laser beam; a scanning device which irradiates an area including a region to be inspected so as to scan the area including the region to be inspected with the laser beam generated from the generating means; a light receiving means, which receives the laser beam incident through the area including the region to be inspected from the scanning device; and a signal deficiency detecting means which detects a deficiency in an output signal produced from the light receiving means.

The present invention further provides an optical barrier apparatus with a specific constitution; comprising a generating means of a laser beam; a laser scanning means which scans an area including a region to be inspected with the laser beam generated from the generating means by using the laser beam as the many parallel optical beams; a semiconductor mirror galvanometer composed of many reflection mirrors which reflect individually the laser beams incident from the laser scanning means through the area including the region to be inspected; and a singular light receiving device receiving the laser beams, which are reflected from the semiconductor mirror galvanometer and incident through the area including the region to be inspected; wherein an anomaly in output signal produced from the singular light receiving device is detected.

By constituting as mentioned above, the present invention can provide an optical barrier apparatus with excellent fail-safe properties, and with manufacturing costs that are low.

BRIEF DESCRIPTION OF THE DRAWINGS

FIGS. 2(a) and 2(c) are views for illustrating a constitution and an operation of Embodiment 1, wherein FIG. 2(a) is a schematic view, FIG. 2(b) is a timing chart and FIG. 2(c) is a block diagram;

FIGS. 3(a) and 3(b) are views showing a constitution of Embodiment 2, wherein FIG. 3(a) is a schematic view and FIG. 3(b) is an illustration of FIG. 3(a);

FIG. 5 is a timing chart of the signal processing circuit in Embodiment 2;

FIGS. 22(a) and 22(b) are views showing another modification of the circuitry shown in FIG. 20, wherein FIG. 22(a) is a block diagram and FIG. 22(b) is a timing chart of FIG. 22(a);

FIG. 24 is a block diagram of Conventional Example 1; and

FIG. 25 is an illustration of Conventional Example 2.

DETAILED DESCRIPTION OF THE PREFERRED EMBODIMENT

Hereinafter is described the best mode of carrying out the present invention into practice corresponding to the preferred embodiments of the optical barrier apparatus. Incidentally, though the preferred embodiment described herein deal with only the semiconductor mirror galvanometer which reflects the laser beam generated from the generating means of the laser beam to scan the area including the region to be inspected, the present invention is not restricted to such a configuration at all. For instance, the above-mentioned combination of the generating means of the laser beam and the semiconductor mirror galvanometer is replaceable with a semiconductor mirror galvanometer-type scanning device which is mounted with a laser diode on the mirror position instead of the mirror, to carry out the scanning of the region to be inspected with a laser beam generated from aforementioned laser diode.

Furthermore, the aforementioned semiconductor mirror galvanometer which reflects the laser beam can be replaced by a static type mirror device as well as by a piezoelectric type mirror device to be described later instead. Moreover, compact-sized scanning devices, which are formed by loading the laser diodes on the mirror positions of above-mentioned state mirror device and above-mentioned piezoelectric mirror device instead of the mirrors, can scan the region to be inspected with the laser beams generated from aforementioned laser diodes.

above-mentioned static type mirror device is a device fabricated in semiconductor manufacturing process steps which drives a movable plate having a mirror thereon by a static electromotive force. An example of those devices has been disclosed as a Japanese Laid-open Patent Publication No. 5-60993 (1993).

The aforementioned type mirror device is to drive the movable plate having the mirror thereon with a piezo-resonator. An example of these devices has been disclosed in SPIE-The International Society for Optical Engineering. "Reprinted from Miniature and Micro-Optics: Fabrication and System Applications Volume, P.1554" (published July of 1991).

Embodiment 1

Figure 1:
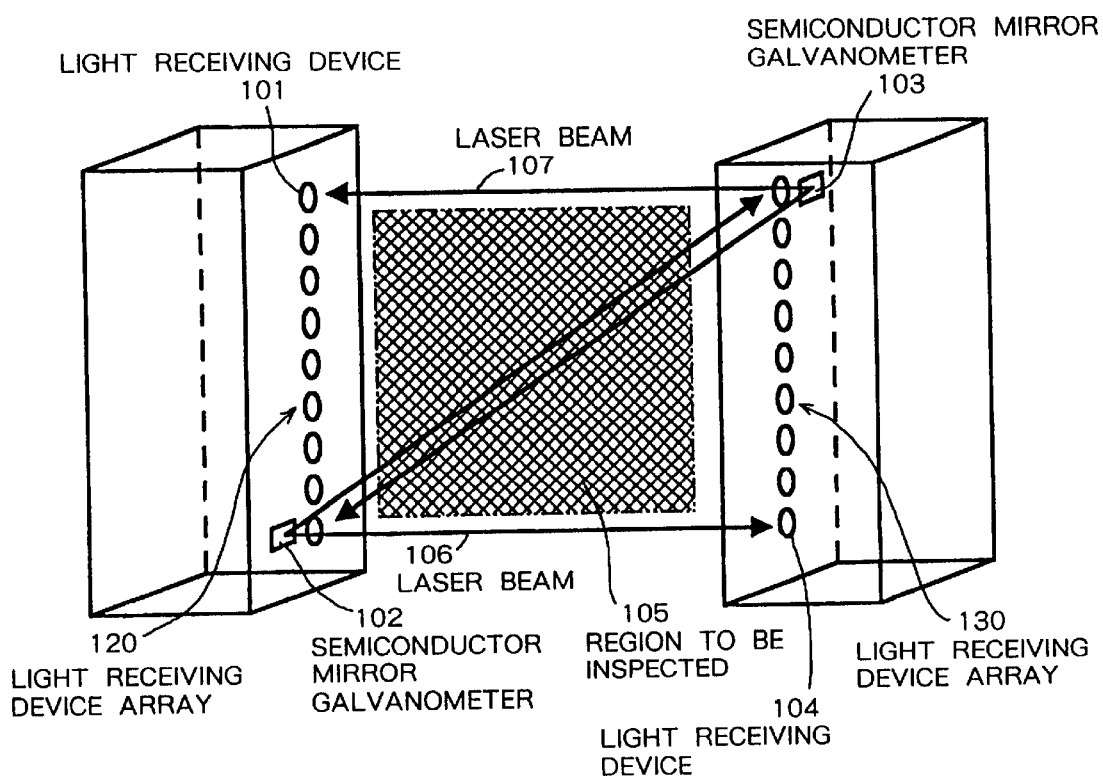
FIG. 1 is a view showing a schematic constitution of major components of Embodiment 1 according to the present invention.
Figure 19:
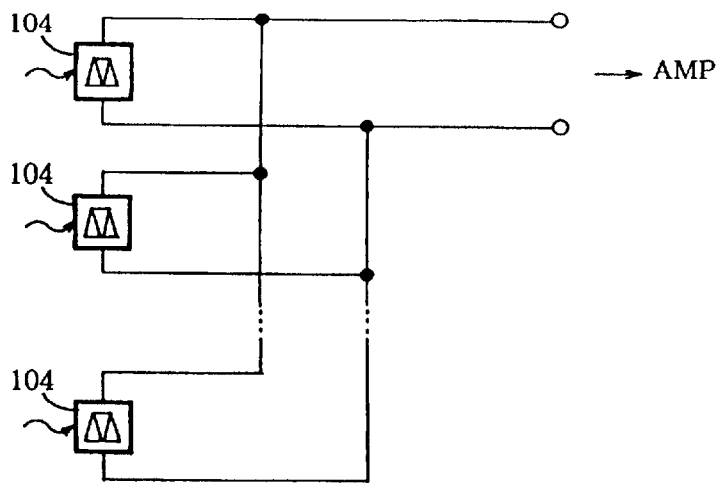
FIGS. 19(a) and 19(b) are circuit diagrams showing two examples of wired OR circuits which transmit output signals produced from light receiving devices shown in FIG. 1.
Figure 19:
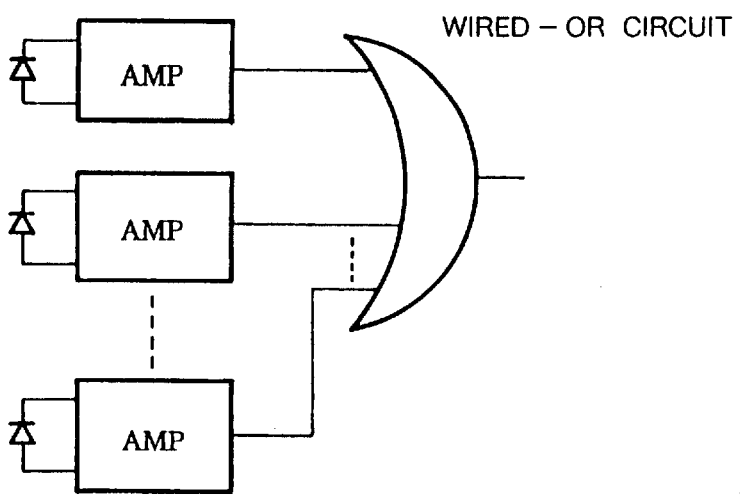

FIG. 1 is the view showing the schematic constitution of the major components of "the optical barrier apparatus" in Embodiment 1. In FIG. 1, a plurality of light receiving devices 101 formed of phototransistors constitute an array 120 of the light receiving devices aligned at a certain interval along a vertical line. A semiconductor mirror galvanometer 102 for reflecting a laser beam continuously oscillated by a generating means of the laser beam unshown in the figure rotates around a horizontal axis so as to irradiate a region 105 to be inspected with another laser beam 106, which is a reflected light of above-mentioned continuously oscillated laser beam. Another plurality of light receiving devices 104 formed of another phototransistors constitute another array 130 of the light receiving devices aligned at another certain interval along another vertical line. Each output signal generated from each of the light receiving device arrays 120 and 130 are fetched through respective wired OR logic circuits from individual output signals produced from the light receiving devices 101 and 104. For instance, the fetching of each output signal can be done by constituting one of circuits shown in FIGS. 19(a) and 19(b). Similarly to the semiconductor mirror galvanometer 102, another semiconductor mirror galvanometer 103 reflects another laser beam generated from another generating means of another laser beam unshown in the figure to produce another reflected laser beam 107.

The laser beams 106 and 107 reflected into the region 105 to be inspected are sequentially incident into each of the light receiving devices 104 and 101 constituting the respective light receiving device arrays 130 and 120 if the obstacle such as any of the hand and the like does not exist in the region 105 to be inspected.

Figure 2:
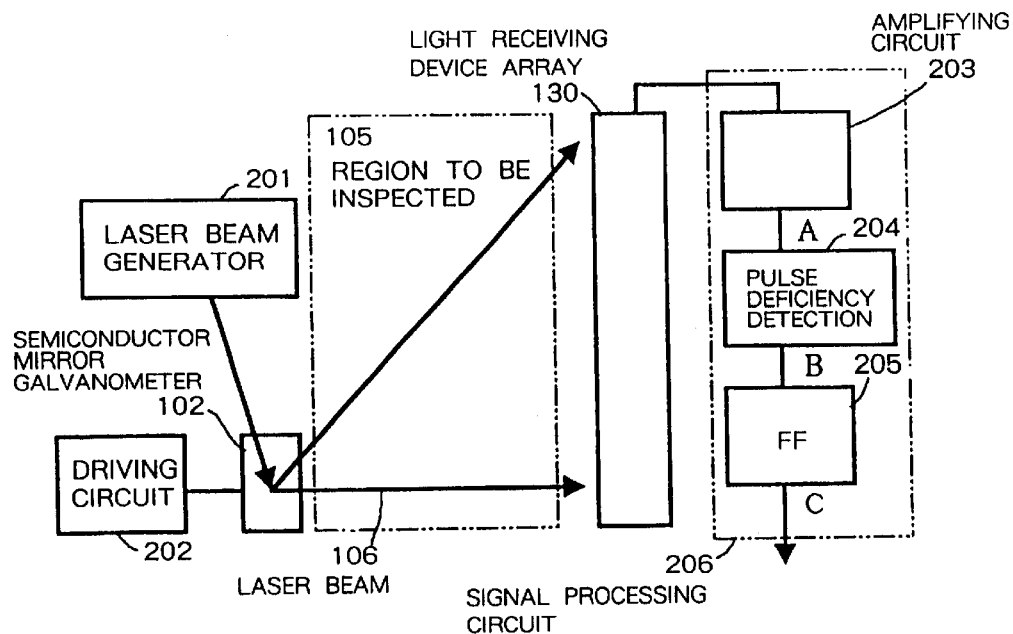
Figure 2:
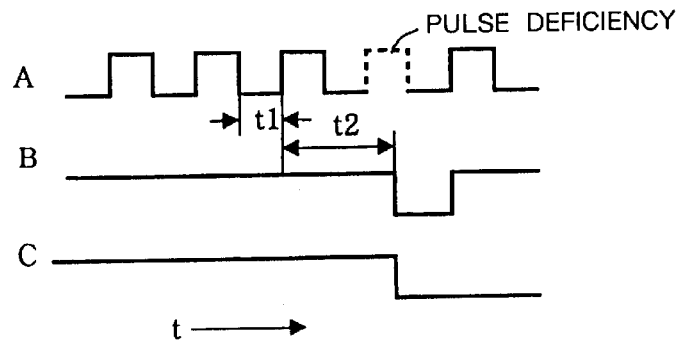
Figure 2:
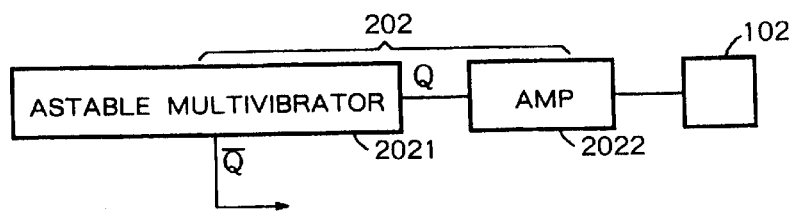

FIGS. 2(a), 2(b) and 2(c) are the views for illustrating the constitution and the operation of the present embodiment. In FIGS. 2(a), 2(b) and 2(c), only a first unit which includes the semiconductor mirror galvanometer 102 and the light receiving device array 130 is illustrated. Because a second unit which includes the semiconductor mirror galvanometer 103 and the light receiving device array 120 is constituted and operated similarly to the first unit shown in FIGS. 2(a), 2(b) and 2(c), its illustration and expression are omitted. The present embodiment is constituted so that a logical product is obtained by applying the two output signals generated from the two units to a fail-safe AND circuit.

In FIGS. 2(a), 2(b) and 2(c), FIG. 2(a) illustrates a constitution of the first unit while FIG. 2(b) illustrates signal waveforms retrieved from various stages of the first unit. In FIG. 2(a), a generating means 201 of a laser beam having a laser diode is provided in a vicinity of the semiconductor mirror galvanometer 102 to irradiate the mirror of the semiconductor mirror galvanometer 102 with the generated laser beam. A driving circuit 202 is to drive the semiconductor mirror galvanometer 102 so that the semiconductor mirror galvanometer 102 operates at a certain rocking angle in a resonant state. For instance, an output signal generated from an astable multivibrator 2021 shown in FIG. 2(c) is applied to an amplifier 2022 for amplification. The amplified signal then can be applied to semiconductor mirror galvanometer 102 to be driven. Furthermore, the amplified signal is also available to drive another semiconductor mirror galvanometer 103, which belongs to the other unit located opposite to the first unit. An amplifying circuit 203 is to amplify an output signal produced through the wired OR logic circuit from the respective light receiving devices 104 constituting the array 130 to a desired signal level. A pulse deficiency detecting circuit 204 which detects a deficiency in output pulse generated from the amplifying circuit 203 is a retriggerable one-shot multivibrator circuit having a function to invert an output signal produced from the circuit 204 if no pulse is applied to the circuit 204 for a certain period of time. A flip-flop circuit 205 inverts its own output signal in response to the signal inversion of the output signal produced from the pulse deficiency deleting circuit 204 and holds the inversion status of the output signal until a reset signal is applied. Incidentally, a fail-safe ON-delay circuit is substitutable for this current if it is used for a fail-safe signal processing.

Although the semiconductor mirror galvanometer 102 reflects the continuously oscillated laser beam which is incident from the laser beam generating means 201, the output signal produced from the light receiving device array 130 turns to a pulse train having a low level period of time $t_1$ as can be seen from "A" of FIG. 2(b) because the light receiving devices 104 are aligned at the certain interval in the light receiving device array 130. A time constant during detection in the pulse deficiency detection circuit 204 is represented by $t_2$ as shown in "A" of FIG. 2(b). If no pulse train is applied to the circuit 204 for a period longer than $t_2$, the output signal produced from the circuit 204 is inverted to the low level.

As Embodiment 1 is constituted as mentioned above, the pulse deficiency detecting circuit 204 does not invert the output signal level and the flip-flop circuit 205 continues to produce the output signal of the high level status if there exists no obstacles in the region 105 to be inspected. If an obstacle appears in the region 105 to be inspected and interrupts the laser beam 106, at least some portions of the light receiving devices 104 constituting the light receiving devices array 130 shaded by the obstacle lose the output signals so that the deficiency takes place in output pulse produced from the light receiving device array 130 as shown in "A" of FIG. 2(b). The deficiency in pulse inverts the output signal generated from the pulse deficiency detecting circuit 240 as shown in "B" of FIG. 2(b). The signal inversion induced in the output signal produced from the circuit 204 inverts the output signal generated by the flop-flip circuit 205 from the high level status to the low level status as shown in "C" of FIG. 2(b). This detects that the obstacle exists in the region 105 to be inspected which is scanned by the first unit.

Because the logical product is produced between the output signal produced from the first unit and another output signal produced from the second unit as mentioned before in the present embodiment, at least one of two output signals produced from two units turns to the low level status and accordingly the output signal of the present embodiment is inverted into the low level status if the obstacle appears in the region 105 to be inspected, which makes it possible to detect the existence of the obstacle.

Hereinafter actual constitution of the fail-safe circuits composed of the fail-safe ON-delay circuits are described with reference to drawings from FIG. 20 to FIG. 22(b).

Figure 20:
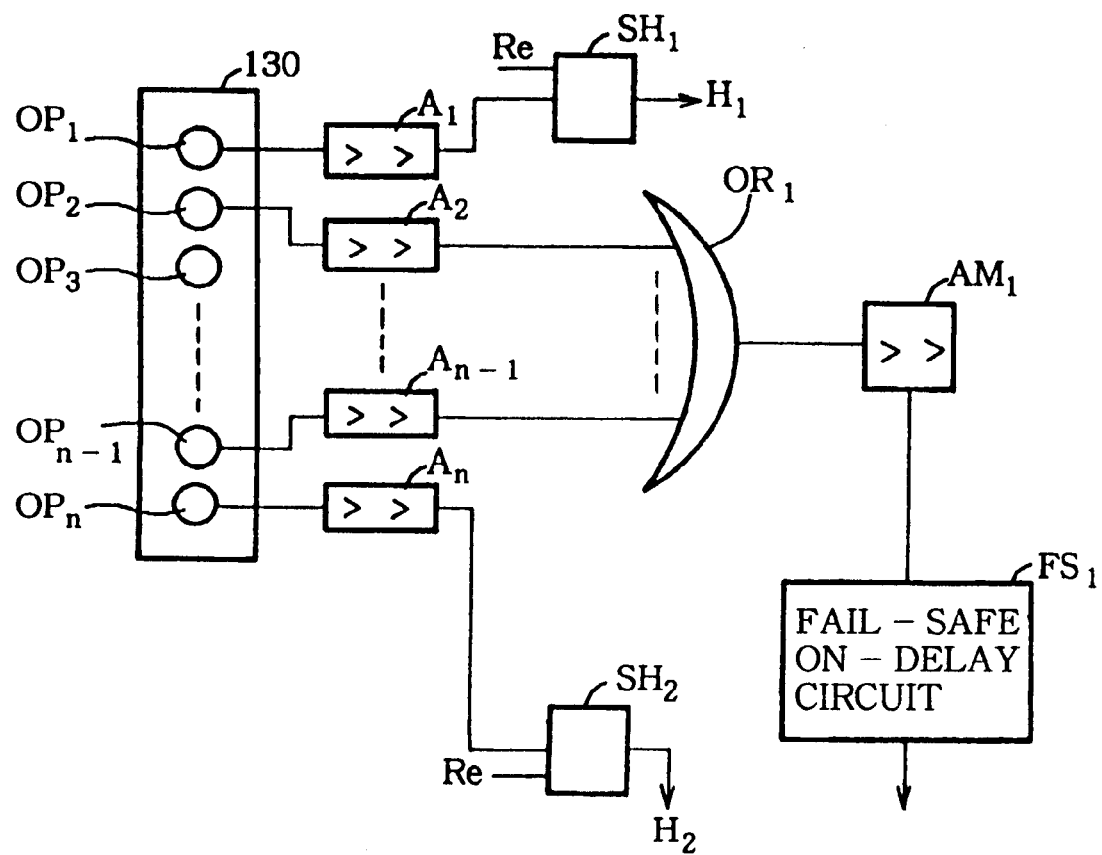
FIG. 20 is a block diagram showing an example of actual circuit capable of acquiring the fail-safe property attached to Embodiment 1 shown in FIG. 2(a)

First, FIG. 20 will be detailed. The respective light receiving devices 104 constituting the light receiving array 130 are provided in juxtaposition to each other from an uppermost device $OP_1$ through $OP_2$, . . . $OP_{n-1}$ to a lowermost device $OP_n$, wherein a necessary device number is denoted by n. The uppermost $OP_1$ and the lowermost $OP_n$ are connected through respective amplifiers $A_1$ and $A_n$ to respective fail-safe selfholding circuits $SH_1$ and $SH_2$ to generate respective output signals $H_1$ and $H_2$, which are utilized for confirming that a scanning function of the semiconductor mirror galvanometer 102 between the device $OP_2$ and the device $OP_{n-1}$ is assuredly operated. If a scanning amplitude of the semiconductor mirror galvanometer 102 turns smaller, one of the output signals $H_1$ and $H_2$ or both of them disappears, thereby informing that an ambiguity arises in a question as to whether a laser beam scanning function operates assuredly between $OP_2$ and $OP_{n-1}$ or not. This indicates that a failure mode arises thereby to turn the output to the low level, which can attain the fail-safe property.

The respective light receiving devices 104 corresponding to the devices from $OP_2$ to $OP_{n-1}$ are connected through respective amplifiers from $A_2$ to $A_{n-1}$ to an OR circuit $OR_1$, which is further connected through another amplifier $AM_1$ to a fail-safe ON-delay circuit $FS_1$ to transmit a necessary output signal. This output signal produces a logical product multiplied with a aforementioned output signals transmitted from the devices $OP_1$ and $OP_n$ to be capable of maintaining the fail-safe property during detecting both the anomaly in equipment and the existence of the obstacle.

Next, FIG. 21 will be described.

Figure 21:
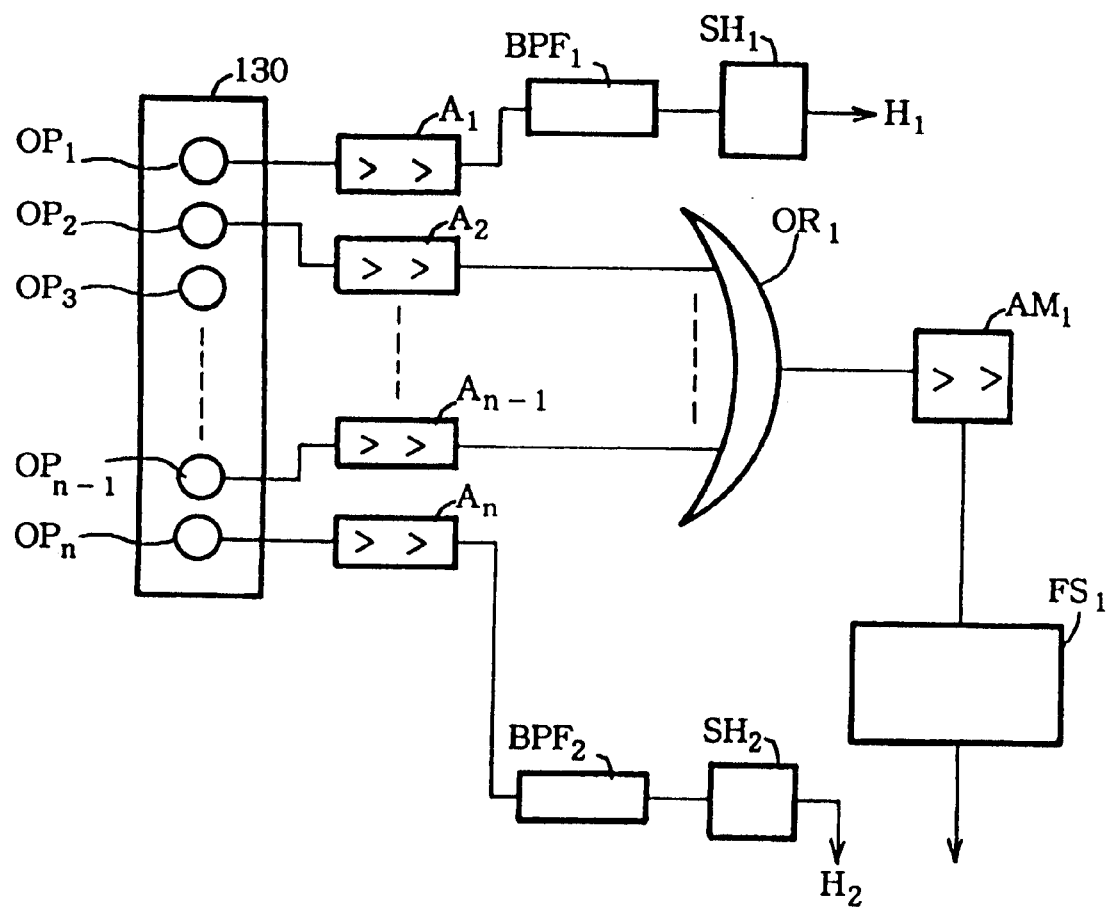
FIG. 21 is another block diagram showing a modification of the circuitry shown in FIG. 20.
Figure 22:
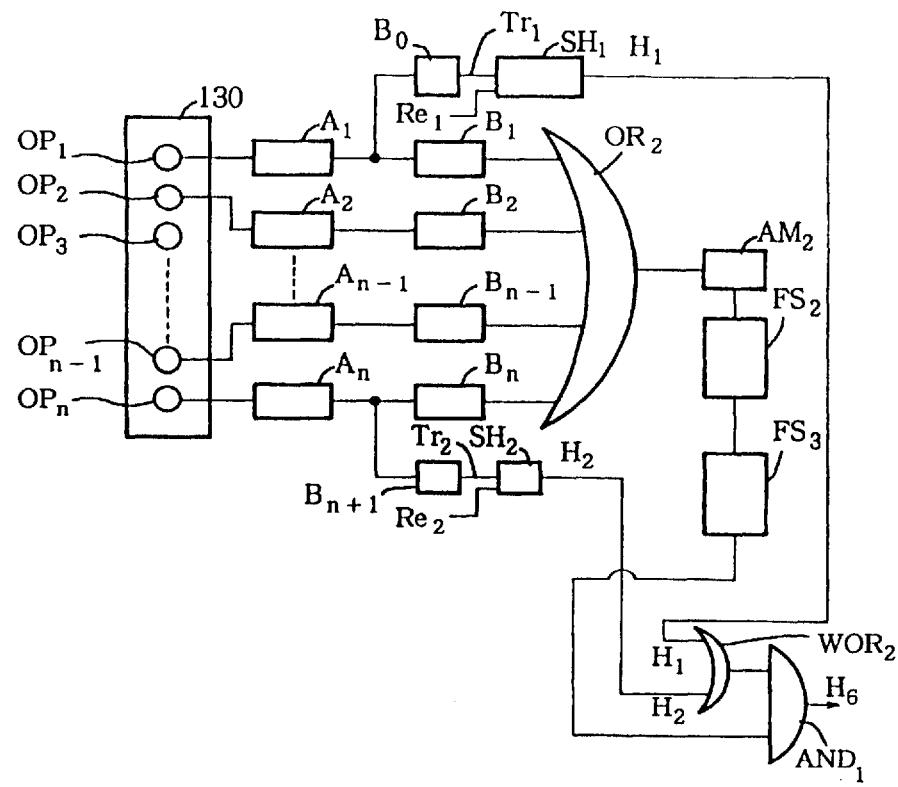
Figure 22:
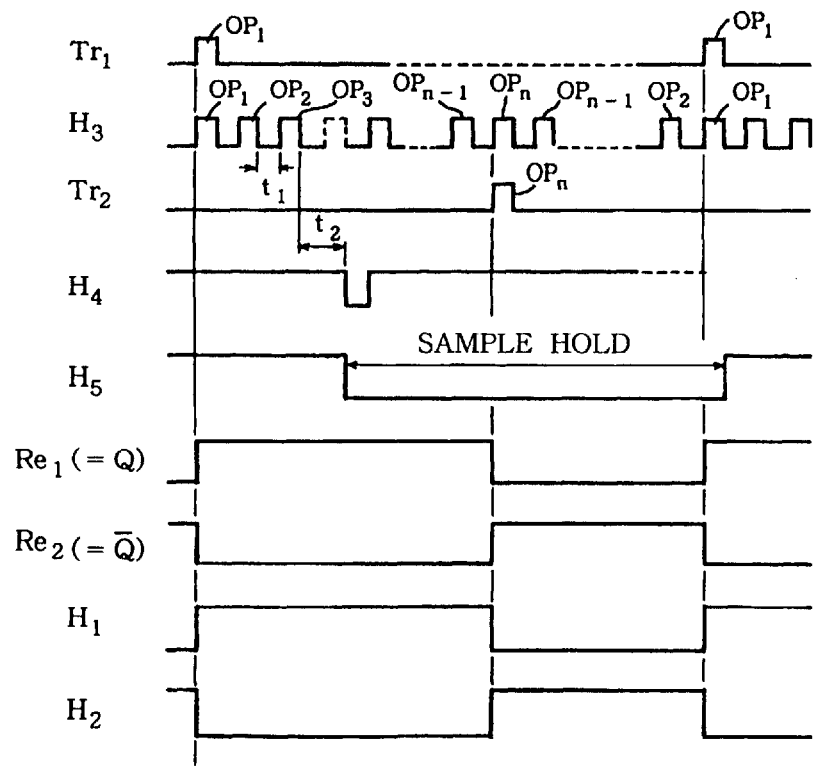

A circuit shown in FIG. 21 is dissimilar to the circuit shown in FIG. 20 only on a point that monitoring circuits $BPF_1$ and $BPF_2$ are provided on the stages prior to the respective fail-safe self-holding circuits $SH_1$ and $SH_2$ while there is no difference except for the joint mentioned above. Accordingly, detailed description of the circuit is omitted.

Herein the monitoring circuits $BPF_1$ and $BPF_2$ monitor an oscillating frequency of the stable multivibrator 2021 which drives the semiconductor mirror galvanometer 102. If the oscillating frequency lowers to induce an anomaly in driving operation, the monitoring circuits produce a delay in scanning operation to shift the scanning operation to a dangerous side.

Furthermore, FIGS. 22(a) and 22(b) are described.

First, FIG. 22(a) is the circuit diagram, wherein the respective light receiving denotes 104 indicated as $OP_1$, $OP_2$, . . . $OP_{n-1}$ and $OP_n$ constituting the light receiving device array 130 are connected through double stage amplifiers $A_1, A_2, \ldots, A_{n-1}$ and $A_n$ and $B_1, B_2, \ldots, B_{n-1}$ and $B_n$ to an OR circuit $OR_2$. The OR circuit $OR_2$ is further connected through an amplifier $AM_2$ to another double stage fail-safe ON-delay circuits $FS_2$ and $FS_3$ to transmit a necessary output signal.

In the presence circuit, respective output signals generated from the uppermost device $OP_1$ and the lowermost device $OP_n$ of light receiving devices 104 an amplified through respectively connected amplifiers $B_n$ and $B_{n-1}$ to be applied to the respective fail-safe self-holding circuits $SH_1$ and $SH_2$ similarly to aforementioned circuits. Accordingly, the scanning operation of the laser beam between the devices $OP_2$ and $OP_{n-1}$ is confirmed by the respective output signals $H_1$ and $H_2$ transmitted from the respective circuits $SH_1$ and $SH_2$ similarly to aforementioned circuits shown in FIGS. 20 and 21, a column of the light receiving devices from $OP_1$ to $OP_n$ being considered as a dangerous zone. Moreover, because an AND-gate circuit, $AND_1$, which produces a logical sum between an output generated from a wired-OR circuit $WOR_2$ and another output generated from the fail-safe ON-delay circuit $FS_3$, transmits an output signal $H_6$ having either a high level or a low level, the present circuit improves remarkably so called fail-safe property.

Subsequently, operations of above-mentioned circuitry are described with reference to the timing chart shown in FIG. 22(b) when the laser beam to be incident, for instance, to the device $OP_4$ of the light receiving devices 104 is hindered by the obstacle.

An output signal H, produced from the OR circuit $OR_2$ is formed of a pulse train including a low level period of time $t_1$ corresponding to the respective output signals generated from the respective light receiving devices 104 constituting $OP_1, OP_2, \ldots$ Herein $t_2$ is a time constant for detecting a deficiency in the pulse deficiency detecting circuit. If the output signal generated from OP$_4$ is deficient, the fail-safe ON-delay circuit FS$_2$ lowers a potential of its output signal H$_4$ to the low level to transmit an anomaly to the following fail-safe ON-delay circuit FS, after the period of time t$_2$ elapses since a beginning of the low level period of the output signal transmitted from the device OP$_3$. An output signal H$_5$ produced from the circuit FS$_3$ is inverted then to the low level and is sampling-held at that status until a subsequent scanning begins.

On the other hand, the fail-safe self-holding circuits SH$_1$ and SH$_2$, which serve for the uppermost device OP$_1$ and the lowermost device OP$_2$, are to receive trigger signals produced from trigger circuits Tr$_1$ and Tr$_2$, which function when the astable multivibrator 2021 driving the semiconductor mirror galvanometer 102 starts scanning. The circuits SH$_1$ and SH$_2$ are similarly to be reset in response to applied reset signals Re$_1$ and Re$_2$. On a case shown in FIG. 22(b), the outputs H$_1$ and H$_2$ produced from the respective fail-safe self-holding circuits SH$_1$ and SH$_2$ exhibit alternately the high level status and the low level status being delayed for a half period to each other, which does not indicate any anomaly now.

However, because the signal H$_5$ applied to the AND-gate AND$_1$ is located in the low level, the output produced from the AND-gate AND$_1$ is also inverted to the low level no matter what the output produced from wired-OR circuit WOR$_2$ may be, which indicates an occurrence of the anomaly.

As mentioned above, it is possible to inspect completely the scanning area maintaining the fail-safe property.

By constituting the apparatus so that the output signals produced from the circuits including the logical product circuit located on a final stage turn assembly to the low level status whenever the apparatus has any instrumental failures, it turns attainable to "confirm a safety status" that there exists neither machine trouble nor obstacle so long as the output signals are located in the high level status.

Because the present embodiment employs the scanning technology utilizing the laser beam as described above, the filters attached individually to the light receiving devices as shown in Conventional Example 1 and the synchronous circuits attached to Conventional Example 2 turn unnecessary anymore, which enables the manufacturing cost reduction without losing the fail-safe property. Furthermore, a simplicity in constitution makes it possible to carry out easily the fail-safe constitution into practice, wherein aforementioned "confirming safety" is attainable. Moreover, the laser beam employed in the present embodiment can raise the resolution in detection higher, rendering the focusing lens attached individually to the light receiving devices unnecessary, and can widen the area of the region to be inspected because the laser beam does not diffuse in the air.

Embodiment 2

Figure 3:
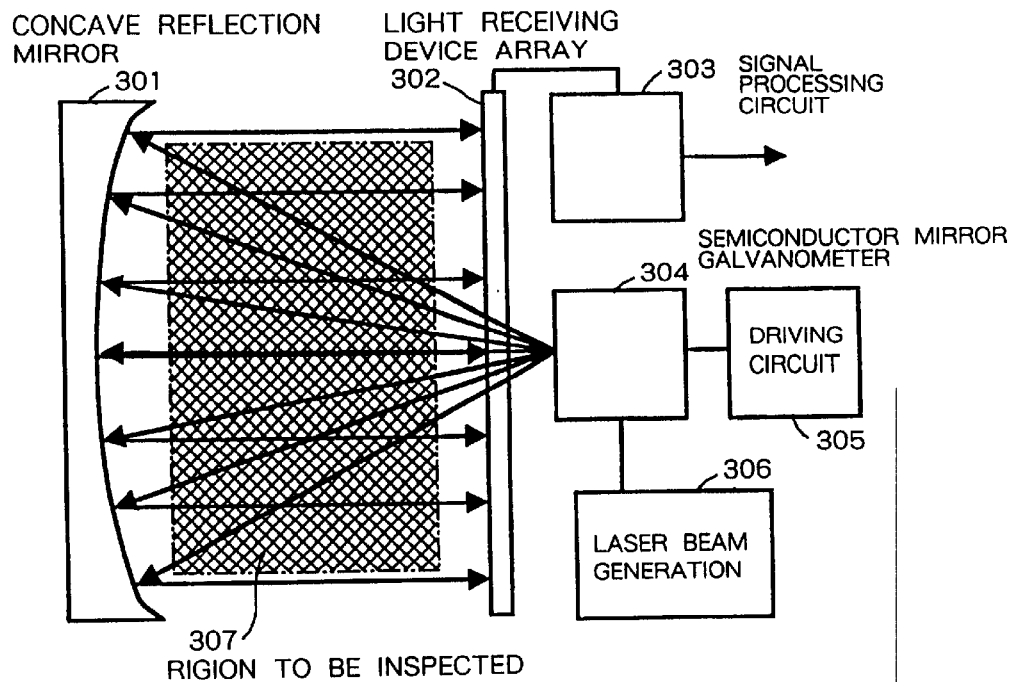
Figure 3:
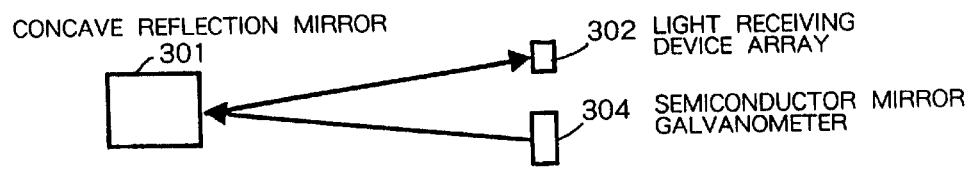

FIGS. 3(a) and 3(b) are views showing the constitution of an "optical barrier apparatus" of Embodiment 2, wherein FIG. 3(a) is a side view of a region 307 to be inspected meanwhile FIG. 3(b) is a plan view of the region 307 to be inspected. The present embodiment is the same as Embodiment 1 from a standpoint that the semiconductor mirror galvanometer 304 driven by the driving circuit 305 reflects the laser beam generated from the generating means unshown in the figure so that the region to be inspected is scanned with the reflected laser beam. However, it differs from Embodiment 1 from another standpoint that the reflected beam is not applied directly to the light receiving device array but is subjected again to another reflection on a concave reflection mirror 301 to be applied then to a light receiving device array 302 as shown in FIGS. 3(a) and 3(b). By constituting the apparatus as mentioned above, the laser beam reflected from the concave reflection mirror 301 can also scan the region 307 to be inspected so that a whole area of the region 307 to be inspected can be scanned with only one unit. Because the scanning by a use of the laser beam herein is carried out linearly in a vertical direction, manufacturing of the concave reflection mirror 301 does not require such a high precision that the mirror fabricated by, for instance, a machine work satisfies a performance of the laser beam scanning, which does not raise the manufacturing cost of the apparatus.

Figure 4:
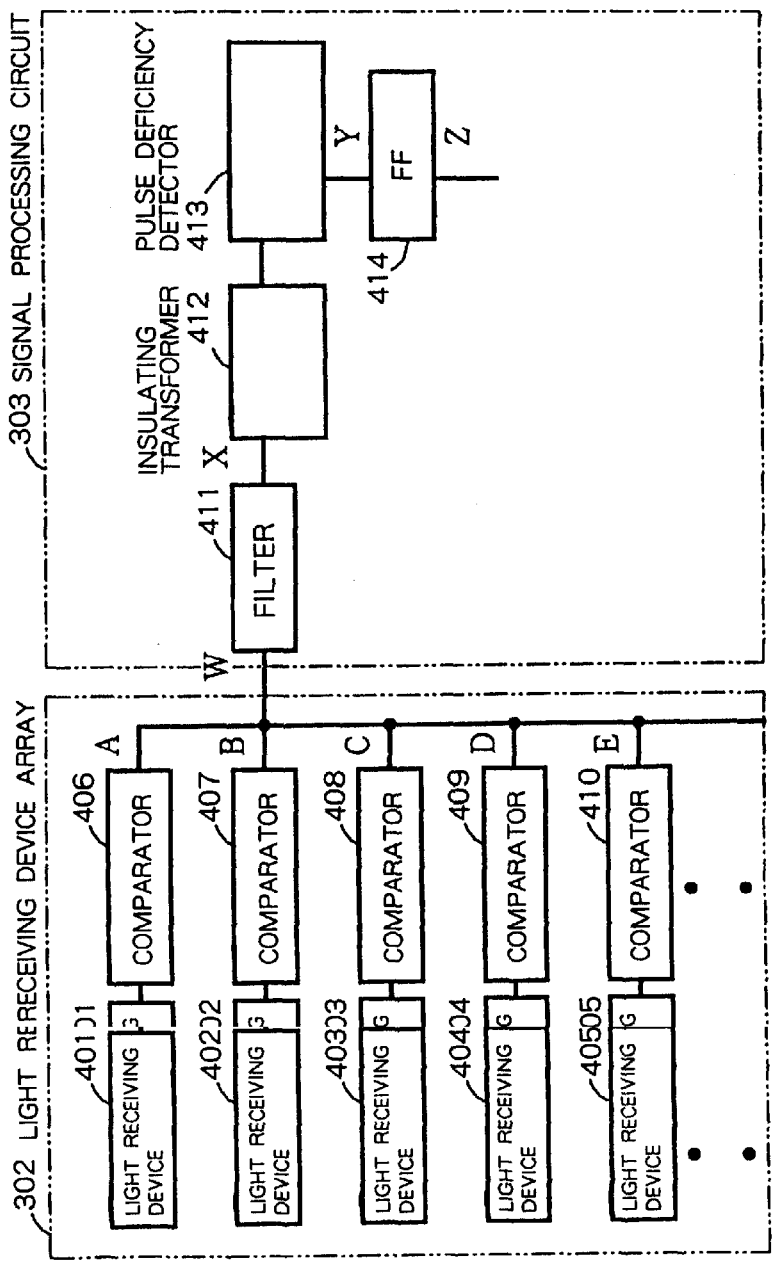
FIG. 4 is a block diagram of a light receiving device array and a signal processing circuit in Embodiment 2.

FIG. 4 is the block diagrams showing the light receiving device array 302 and the signal processing circuit 303 of the present embodiment. As shown in the figure, the detection of the obstacle located in the region 307 to be inspected in the present embodiment is carried out similarly to Embodiment 1 by a use of a pulse deficiency detecting circuit 413 which detects the deficiency in the output pulses produced from the light receiving device array 302 to inverts an output signal produced from a flip-flop circuit 414. The present embodiment employs the concave reflection mirror 301 which makes a projection path of the laser beam longer so that the system suffers remarkably from an ill-effect of disturbed lights incident from an outside. Consequently, a generating means 306 of the laser beam in the present embodiment transforms the laser beam into a pulse train having a specified frequency. Furthermore, a band-pass filter 411 to pass only a signal having above-mentioned specified frequency is provided in the signal processing circuit 303 meanwhile respective comparators 406 to 410 . . . are connected serially to the respective light receiving devices 401 to 405 . . . located in the light receiving device array 302. The constitution mentioned above is to eliminate the effect of the disturbed light incidence from the outside. Namely, the band-pass filter 411 eliminates pulsed signals generated by the disturbed light incidence from the outside having any frequencies except for the specified frequency and passes only the pulse train having the specified frequency accompanied with the laser beam. On the other hand, the comparators 406 to 410 do not invert their output signals even if the input pulses generated by the disturbed lights incident from the outside which have signal levels lower than a specified level are applied. The comparators 406 to 410 do not invert their output signals, either, even if the input pulses generated by the laser beam which have the signal levels lower than the specified level are applied. Only when the input pulses generated by the laser beam which have the signal levels higher than the specified level are applied, the comparators 406 to 410 invert their output signals and transmit only desired signals to the pulse deficiency detecting circuit 413.

Incidentally, amplifications are accompanied on cases when signal levels of the outputs produced from the light receiving devices and produced from the filters are low. Amplifiers used on such cases are omitted to be illustrated in the present specification. A fail-safe amplifier has been disclosed in FIG. 22 of PCT International Publication No. WO 94/23303.

FIG. 5 is the timing chart of the signal processing circuit 303. As can be seen from the figure, the detection of obstacles in the present embodiment is carried out by detecting the deficiencies in output pulses produced from the light receiving device array similarly to Embodiment 1.

In FIG. 4, an example is indicated wherein the insulating transformer 412 is employed to eliminate a direct current component from the signal. When a high-level input signal is continuously applied to the insulating transformer 412 due to, for instance, a failure induced in the devices 401 to 411 and the like constituting the circuit independently of the existence of the obstacle, the insulating transformer blocks the high-level input signal to turn a potential of an input port of the pulse deficiency detection circuit 413 into the low-level status, which turns the output signals generated from the pulse deficiency detection circuit 413 into the low-level, resulting the output signal produced from the flip-flop circuit 414 in an inversion status to the low-level. By constituting the circuitry as mentioned above, the output signals are inverted to the low-level status when the devices are in aforementioned failure modes similarly to a period when the apparatus detects the obstacles. Accordingly, if the output signals exhibit the high-level, it is concluded that there exists neither failure mode in circuit components 401 to 411 and the like nor obstacle in the region to be inspected, namely, "safety confirmation" is attainable.

Embodiment 3

Figure 6:
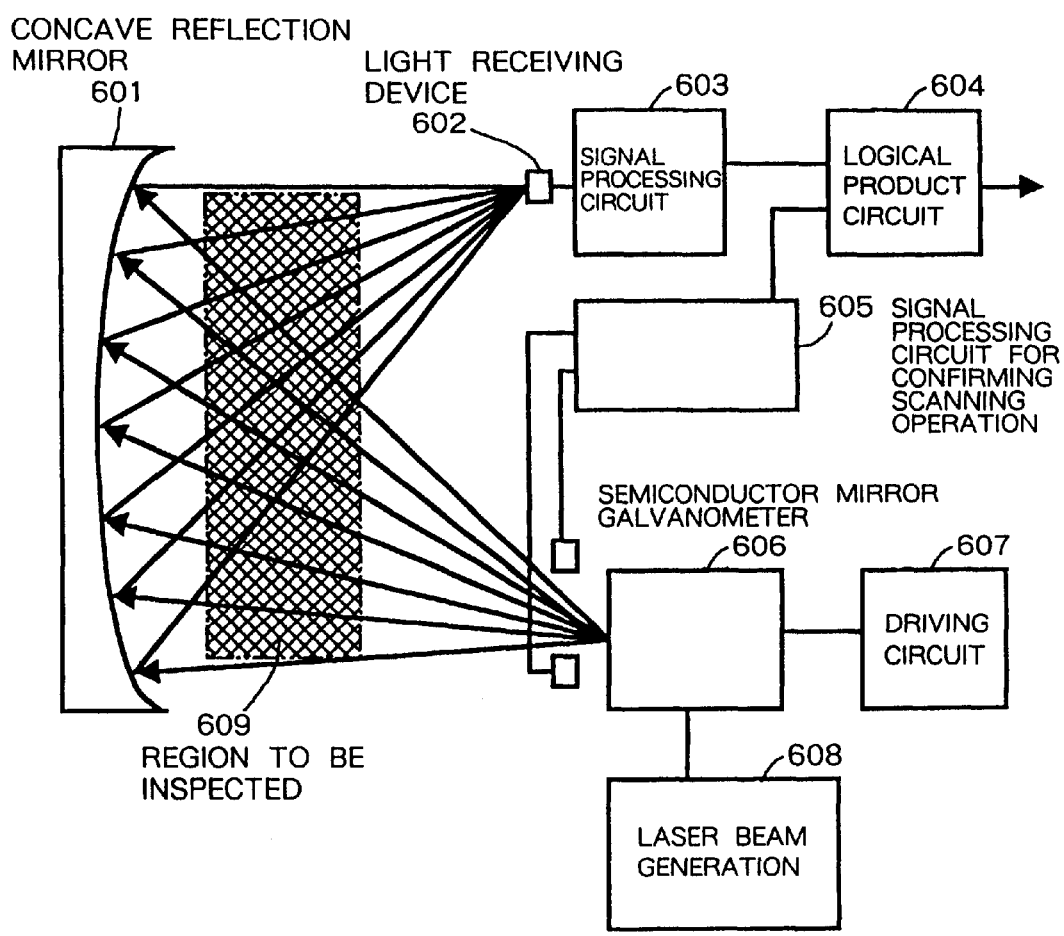
FIG. 6 is a view showing a constituting of Embodiment 3.

FIG. 6 is the view showing the constitution of an "optical barrier apparatus" according to Embodiment 3. The present embodiment is the same as the Embodiment 2 from a standpoint that the laser beam generated from the generating means unshown in the figure is reflected on the semiconductor mirror galvanometer to scan the region to be inspected with the laser beam meanwhile the region to be inspected is also scanned with the laser beam reflected on the concave reflection mirror. However, the present embodiment differs from Embodiment 2 from another standpoint that the laser beam reflected on the concave reflection mirror shall not be received by the light receiving device array but shall be received by only one light receiving device instead. Furthermore, the present embodiment differs from Embodiment 2 from still another standpoint that a confirming part of the scanning operation and a logical product circuit are newly provided.

Figure 7:
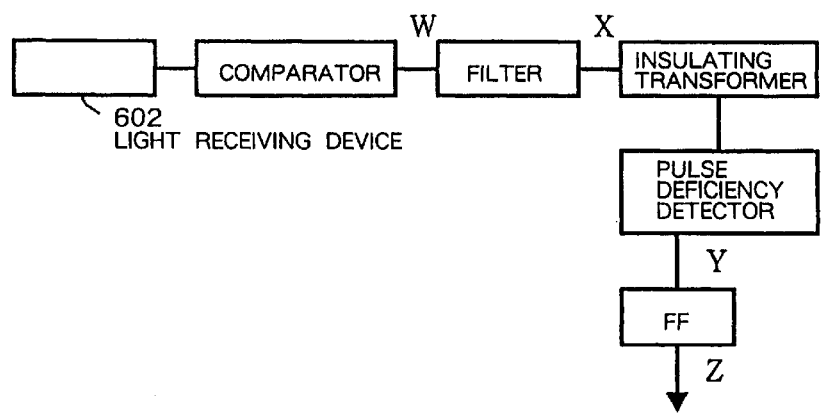
FIG. 7 is a block diagram of a signal processing circuit in Embodiment 3.
Figure 8:
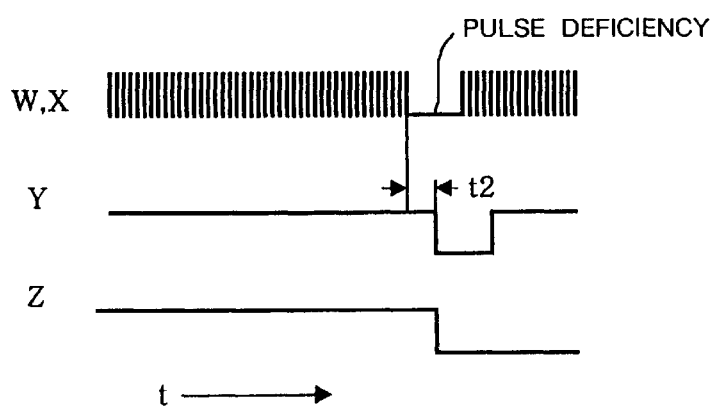
FIG. 8 is a timing chart of the signal processing circuit in Embodiment 3.

FIG. 7 illustrates a constitution of the signal processing circuit 603 in the present embodiment while FIG. 8 indicates the timing chart of the same. Because a number of the light receiving devices use for detecting the obstacles is only one in the present embodiment as shown in the figure, an output signal generated from this light receiving device provides a pulse train formed of continuous pulses as can be seen from W and X in FIG. 8. However, the detection of the obstacles is carried out by the same constitution and the same operation as those of Embodiments 1 and 2 so that its description is omitted.

Figure 9:
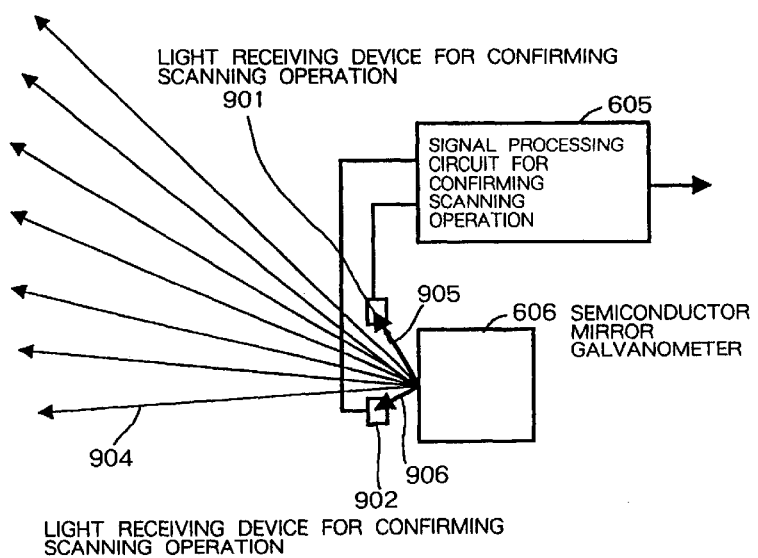
FIG. 9 is a view showing a constitution of a part confirming a scanning operation in Embodiment 3.
Figure 10:
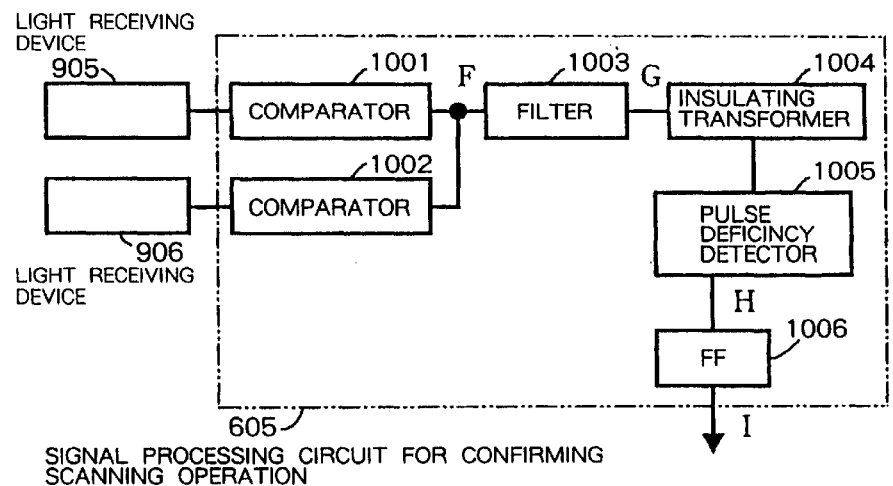
FIG. 10 is a block diagram of the part confirming the scanning operation in Embodiment 3.

FIG. 9 is the view showing the constitution of the part confirming the scanning operation in the present embodiment. FIG. 10 is the block diagram of the part confirming the scanning operation meanwhile FIG. 11 is the timing chart of the part confirming the scanning operation.

In FIG. 9, light receiving devices 901 and 902 for confirming the scanning operation are provided on positions whereon the device 901 and 902 can receive laser beams 905 and 906 which a semiconductor mirror galvanometer 606 has reflected toward an outside of the region to be inspected 609 (cf. FIG. 6). The output signals produced from the light receiving devices 901 and 902 for confirming the scanning operation are applied to input ports of a signal processing circuit 605 confirming the scanning operation.

Figure 11:
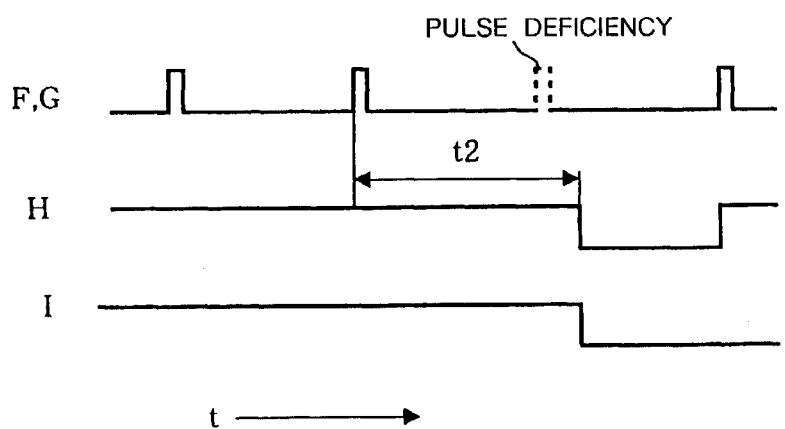
FIG. 11 is a timing chart of the part confirming the scanning operation in Embodiment 3.

The signal processing circuit 605 confirming the scanning operation constituted as shown in FIG. 10 serves to detect an anomaly in scanning operation of the laser beam by detecting a deficiency in signal pulses generated from the light receiving devices 905 and 906 as shown in FIG. 11, similarly to the signal processing circuit 603. Namely, when failure modes such that no laser beam is reflected from the semiconductor mirror galvanometer 606, such that the semiconductor mirror galvanometer 606 does not rotate and such that the semiconductor mirror galvanometer 606 reduces the displacement angle arise, at least one of output signals produced from the light receiving devices 905 and 906 disappears and a deficiency appears in pulses. This phenomenon inverts the output signal H generated from the pulse deficiency detecting circuit 1005 from the high level to the low level to invert the output signal "l" generated from the flip-flop circuit 1006 also from the high level to the low level, of which status is continuously maintained resulting in detection of the anomaly in scanning operation.

Figure 12:
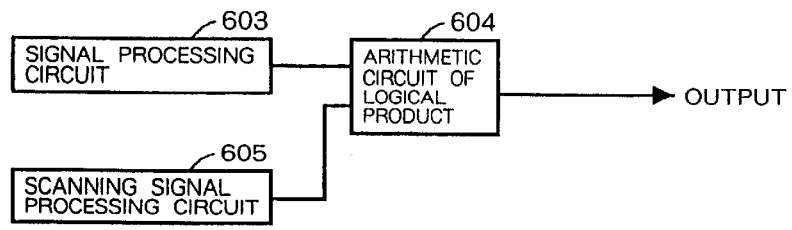
FIG. 12 is a block diagram of an output part in Embodiment 3.

As shown in FIGS. 6 and 12, both the output signal produced from the signal processing circuit 603 which detects the obstacles located in the region 609 to be inspected and the output signal produced from the scanning confirmation signal processing circuit 605 which detects the anomaly in scanning operation of the laser beam covering the region 609 to be inspected are applied to the logical product circuit 604 in the present embodiment. Accordingly, the output signal produced from the circuit 604 is inverted to the low-level when the obstacle is detected as well as when the anomaly takes place in the scanning operation utilizing the laser beam.

By constituting the apparatus including the logical product circuit 604 located on a final stage so that the output signals are turned into the low-level status whenever the anomaly takes place in the apparatus, it is inferable that there is neither instrumental failure mode nor existence of obstacle so long as the output signals are located in high-level status, namely, the "safety confirmation" is obtainable.

Embodiment 4

Figure 23:
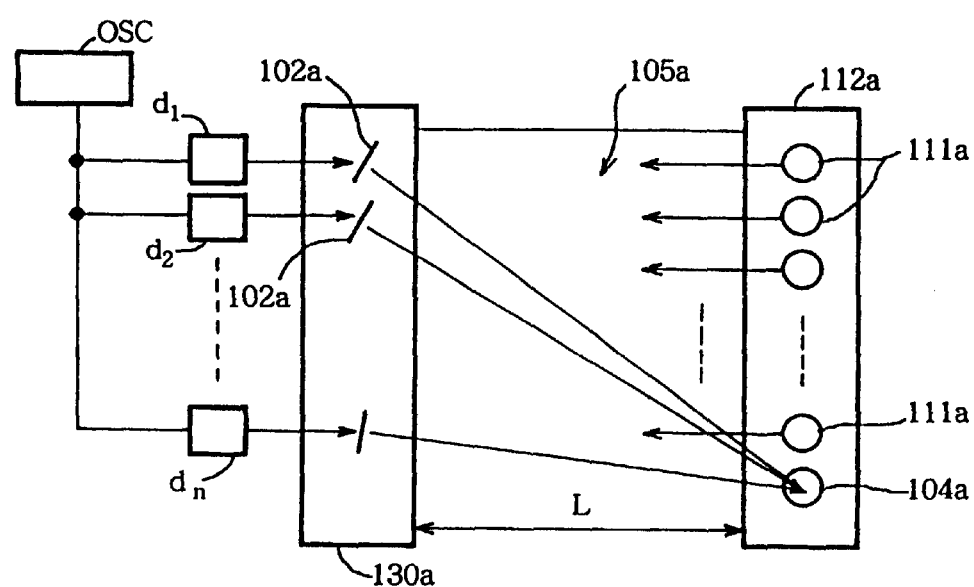
FIG. 23 is a schematic view for illustrating Embodiment 4 according to the present invention, wherein many of the semiconductor mirror galvanometers are disposed.

Subsequently, Embodiment 4 is described with reference to FIG. 23.

The present embodiment comprises a light projecting apparatus 112$a$, which is provided with a light receiving device 104$a$ on a lowermost position and is provided with many of light projecting devices 111$a$ on a position upper than the receiving device 104$a$; a light receiving apparatus 130$a$, which is located remote from the light projecting apparatus 112$a$ and is provided with many of semiconductor mirror galvanometers 102$a$ facing aforementioned light projecting devices 111$a$; and a driving circuit, which is formed of an oscillator OSC and is formed of a plurality of drivers $d_1, d_2, \ldots$ and $d_n$ driving the semiconductor mirror galvanometers 102$a$, enabling to irradiate respective optical beams reflected from the respective mirror galvanometers 102$a$ sequentially onto the light receiving device 104$a$ located on aforementioned light projecting apparatus 112$a$; wherein the light beams transmitted from many of the light projecting devices 111$a$ are always projected as linear optical beams toward the side of the receiving apparatus 130$a$.

Accordingly, an oscillation signal transmitted from the oscillator OSC energizes sequentially the drivers $d_1, d_2, \ldots$ and $d_n$ to tilt the respective mirrors 102$a$ toward the light receiving device 104$a$'s side to scan the region 105$a$ to be inspected, enabling the detection of the anomaly in the region 105$a$ to be inspected. The output signal produced from the light receiving device 104$a$ operates as the same as those shown in aforementioned embodiments and in aforementioned circuits to be carried out into practice, obtaining so called fail-safe effect.

In the present embodiment, a control of a distance L from the light projecting apparatus 112a to the light receiving apparatus 130a turns unnecessary. Furthermore, even if the obstacle having a high reflectivity intervenes in the region 105a to be inspected and rays of light reflected from the obstacles are incident to the light receiving device 104a, the anomaly is immediately detected because the light projecting devices 111a project no pulsed beam but project continuous beam instead, which applies always the input signal to the light receiving device 104a. This brings about an effect on avoidance of endangering the fail-safe property.

Semiconductor Mirror Galvanometer

Figure 13:
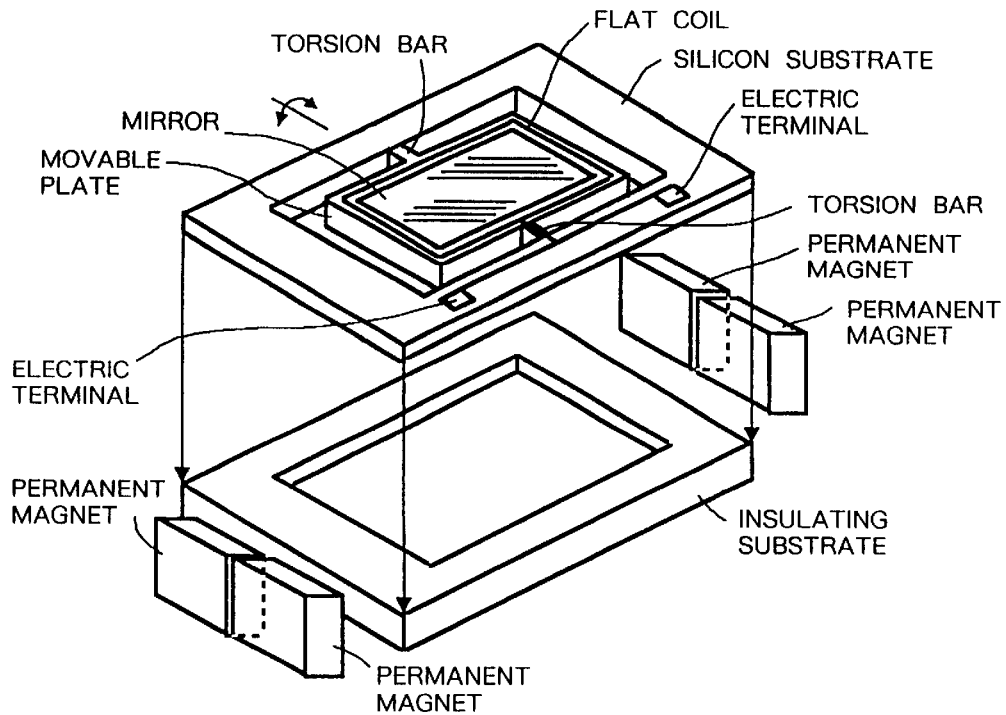
FIG. 13 is a perspective view of a semiconductor mirror galvanometer.

Hereinafter described are constitutions and operations of the semiconductor mirror galvanometer used in the present embodiments. FIG. 13 is an exploded perspective view of the semiconductor mirror galvanometer. Sizes are shown being enlarged for clarity. As shown in the figure, a movable plate supported by torsion bars is formed inside a silicon substrate; a flat coil is formed on peripheries of the movable plate; a mirror is formed on an inner space of a front surface of the movable plate; and permanent magnets are provided on both sidewalls of the silicon substrate which face each other. Polarities of the permanent magnets are adjusted so that N poles orient upwards and S poles orient downwards on one of the sidewalls meanwhile the N poles orient downwards and the S poles orient upwards on another sidewall.

If a current is introduced from one of electric terminals to flow through the flat coil toward another of the electric terminals, forces subjected to Fleming's left-hand rule work on both ends of the movable plate to rotate the movable plate. If an alternating current is fed to the flat coil, the movable plate swings and rocks periodically.

Figure 14:
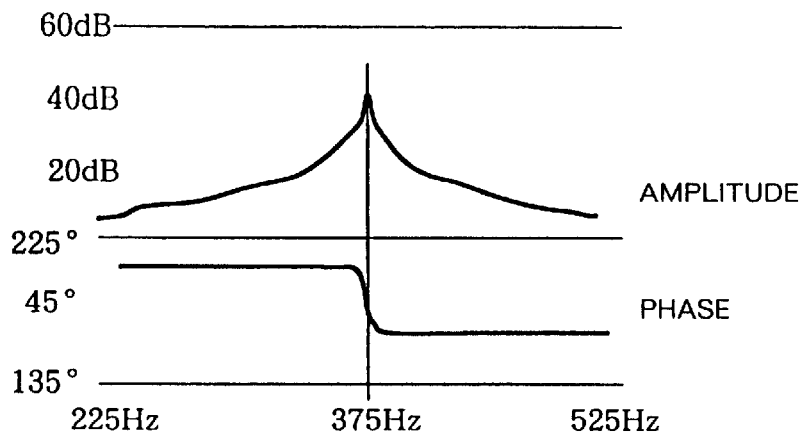
FIGS. 14(a) and 14(b) are graphs showing an example of operational characteristics of the semiconductor mirror galvanometer.
Figure 14:
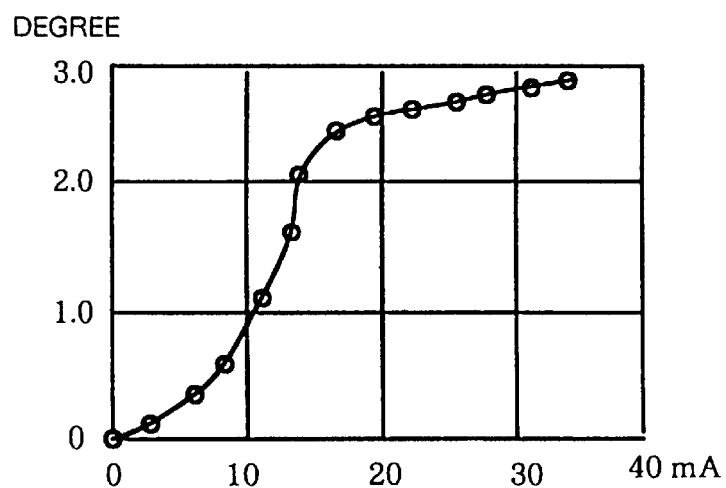

In FIGS. 14(a) and 14(b), the example of the operational characteristics of the semiconductor mirror galvanometers is shown. As can be seen from FIG. 14(a), the movable plate exhibits a resonance at a certain frequency to give a peak in amplitude. FIG. 14(b) illustrates a relationship between an input current and a displacement (swinging) angle during the resonant status. A saturation in displacement angle is due to an air resistance. Because a large displacement angle is obtainable by supplying a low current during the resonant status as shown above, the semiconductor mirror galvanometers are used at the resonant status in the present embodiment.

Hereinafter the constitutions and operations are detailed with reference to a part of the specification of the Japanese Patent Application No. 7-27996 (1995), which has been proposed by the inventors of the present invention. Although their specification differs a little from FIG. 13 as to the disposition of the permanent magnets and others, it scarcely differs as to basic constitutions and operations.

To put is shortly, the semiconductor mirror galvanometer is constituted of a movable plate formed monolithically in a semiconductor substrate, torsion bars which axially support the movable plate on the semiconductor substrate allowing freely to swing and to rock with respect to the substrate, a driving coil formed on peripheries of the movable plate, a generating means of a magnetic field which applies a static magnetic field to the driving coil and a mirror formed on the movable plate.

Figure 15:
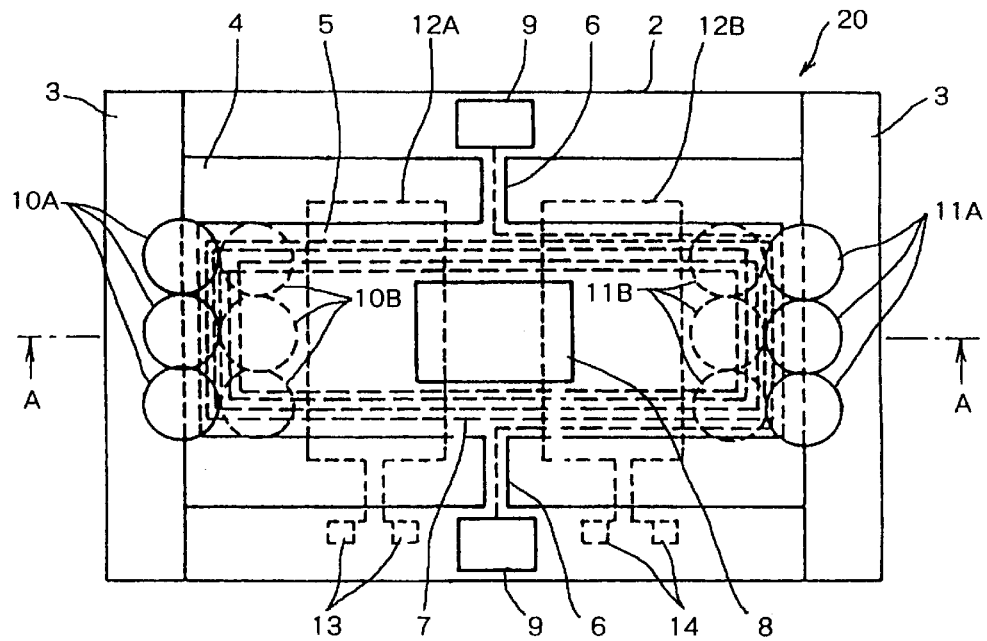
FIG. 15 is a view showing a constitution of the semiconductor mirror galvanometer.
Figure 16:
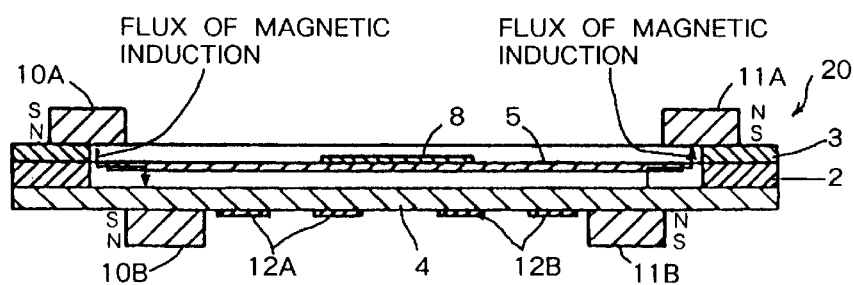
FIG. 16 is a longitudinal section taken along A—A of FIG. 15.

FIGS. 15 and 16 are the views showing the constitution of the mirror galvanometer 20. This apparatus operates in the same principle as that of the galvanoscope (galvanometer). Incidentally, sizes are enlarged for clarity in FIGS. 15 and 16. Situations are the same in FIG. 17 to be described later.

In FIGS. 15 and 16, the semiconductor mirror galvanometer 20 constitutes a three-layered structure formed of a silicon substrate 2 serving as the semiconductive substrate, which has a flat glass substrate 3 acting as an upper insulating substrate formed of, for instance, a borosilicate glass and has another flat glass substrate 4 acting as a lower insulating substrate formed of, for instance, the borosilicate glass. Both of the glass substrates 3 and 4 are bonded on a front and rear surfaces of the silicon substrate 2, respectively. The silicon substrate 2 is stacked with abovementioned upper glass substrate 3 both on left-hand and right-hand ends so that an upper portion of the movable plate 5 to be described later is released to an open air (as shown in FIG. 15).

The flat-shaped movable plate 5 and torsion bars 6, the latter of which axially support the movable plate 5 on central positions of the silicon substrate 2 allowing a vertical swinging or rocking motion of the movable plate 5 with respect to the silicon substrate 2, are monolithically formed in aforementioned silicon substrate 2 by a use of an anisotropic etching technology in semiconductor manufacturing processes. Accordingly, the movable plate 5 and the torsion bars 6 are formed of the same material as that of the silicon substrate 2. On peripheries of a front surface of abovementioned movable plate 5, the flat coil 7 formed of a copper thin-film and covered with an insulating film is provided. Both a driving current to drive the movable plate 5 and a superimposed detecting current to detect the displacement angle are flowed through the flat coil 7. Above-mentioned detecting current is to detect the displacement of the movable plate 5 depending upon mutual inductances between the flat coil 7 and detecting coils 12A and 12B, which are formed on the lower glass substrate 4 in a manner to be described later. Because the displacement angle is not detected in the present embodiment, aforementioned detecting current is not fed. However, the coils are utilizable for an adjustment of the semiconductor mirror galvanometer 102 so that detecting procedures of the displacement angle by a use of the detecting coils are to be detailed later.

Herein a resistivity component of a coil induces a loss due to Joule heat. Because a high-density mounting of highly resistive thin-film coils to form the flat coil 7 restricts a driving force due to a heat generation, aforementioned flat coil 7 is formed by a use of an electrocasting coil forming technology utilizing a well-known electrolytic plating method. In the electrocasting coil forming technology, a thin nickel layer is deposited on a substrate by a use of a sputtering technology. A copper layer is formed on the nickel layer by a use of the electrolytic plating method. Both the copper layer and the nickel layer are eliminated except for an area corresponding to the coil, which forms a thin-film flat coil composed of the copper layer and the nickel layer. The electrocasting coil forming technology has a characteristic property of enabling the high-density mounting of the thin-film coils in low resistive status, which is effective for down-sizing and slenderizing of micromagnetic devices.

Herein a mirror 8 is formed by a use of well-known technology on a central portion of the front surface of the movable plate 5 which is enclosed with the flat coil 7. Furthermore, a pair of the electric terminals 9 and 9 to be electrically interconnected through the torsion bars 6 to the flat coil 7 are formed on the front surface of the silicon substrate 2 adjacently to the torsion bars 6. Those electric terminals 9 and 9 are formed on the silicon substrate 2 by a use of the electrocasting coil forming technology, simultaneously with a formation of the flat coil 7 onto the movable plate 5 by the use of the same technology.

As shown (in FIG. 15), there are provided disk-shaped permanent magnets 10A and 10B constituting pairs to each other on a left-hand side of the upper glass substrate 3 and on a left-hand side of the lower glass substrate 4, respectively. There are also provided another disk-shaped permanent magnets 11A and 11B constituting another pairs on a right-hand side of the upper glass substrate 3 and on a right-hand side of the lower glass substrate 4, respectively. Those pairs of magnets apply magnetic fields to two opposite ends of the flat coil 7, which are located on peripheries of the movable plate 5 and are parallel to an axial direction of the torsion bars 6. The permanent magnets 10A and 10B constituting three vertical pairs to each other are aligned so that each polarity of the upper magnets coincides with that of the lower magnets, for instance, each N pole orients downwards and each S pole orients upwards as shown in FIG. 16. Another permanent magnets 11A and 11B constituting another three vertical pairs are similarly aligned so that each polarity of the upper magnets coincides with that of the lower magnets, for instance, each S pole orients downwards and each N pole orients upwards as shown in FIG. 16. Furthermore, the permanent magnets 10A and 11A both provided on the upper glass substrate 3 are aligned so as to have reversely oriented polarities to each other while the permanent magnets 10B and 11B both provided on the lower glass substrate 4 are aligned so as to have reversely oriented polarities to each other as can be seen from FIG. 16.

As mentioned before, a pair of the coils 12A and 12B, of which respective ends are electrically interconnected to two pairs of electric terminals 13 and 14, are formed by the use of the patterning technology on the rear surface of the lower glass substrate 4. The pair of coils 12A and 12B are set up so as to be capable of an electromagnetic coupling with the flat coil 7. (Incidentally, those coils are schematically illustrated in a single-turned broken line in FIG. 15 but they are actually wound in plural-turned windings.) The detecting coils 12A and 12B are located on symmetric positions with respect to the torsion bars 6 to each other to detect the displacement angle of the movable plate 5. The mutual inductance between the flat coil 7 and one of both detecting coils 12A and 12B increases as a distance in between decreases meanwhile another mutual inductance between the flat coil 7 and another of both detecting coils 12A and 12B decreases as another distance in between increases, due to a change in displacement angle of the movable plate 5. Those changes in mutual inductance are detectable by measuring output signal voltages induced in the detecting coils 12A and 12B, for instance, by a use of differential amplification during flowing of the current for detecting the displacement angle through the flat coil 7 being superimposed on the driving current. As a result, the displacement angle of the movable plate 5 is detectable as the output signal change.

Subsequently, the operations of the semiconductor mirror galvanometer 102 are to be described.

Figure 17:
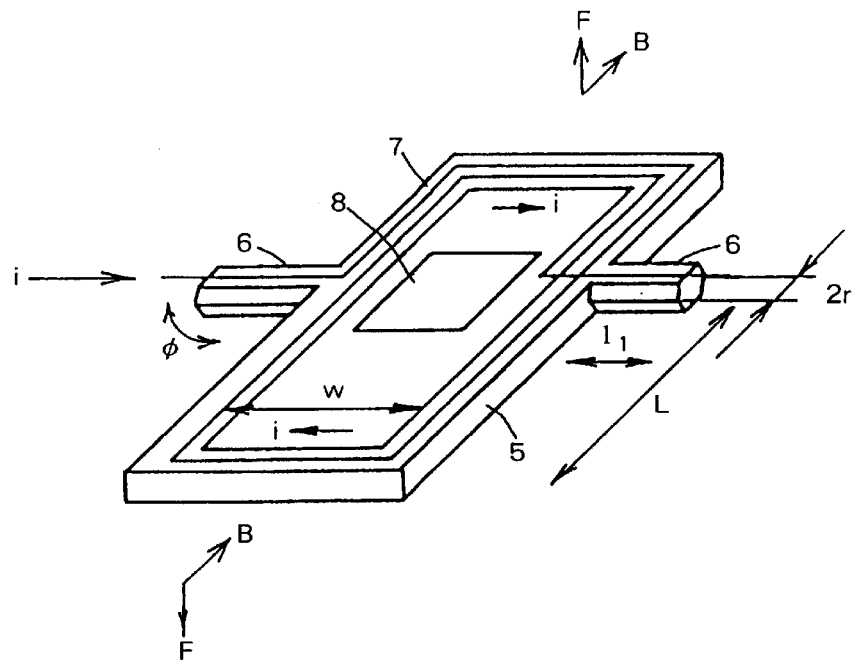
FIG. 17 is a view for illustrating an operation of the semiconductor mirror galvanometer.

A current is introduced between the pair of electric terminals 9 and 9, one of which is used as a plus electrode, for instance, while another is used as a minus electrode to flow through the flat coil 7. Magnetic fields, which traverse the flat coil 7 parallel to a plane of the movable plate 5 and orient in directions designated by arrows B shown in FIG. 17, are induced by the permanent magnets 10A and 10B together with by another permanent magnets 11A and 11B to be applied on both sides of the movable plate 5. When the current flows through the flat coil 7 located in those magnetic fields, forces F are generated on both sides of the flat coil 7, namely, on both sides of the movable plate 5 in response to a current density and a flux density of the magnetic induction, in directions (represented by arrows F shown in FIG. 17) in accordance with the Fleming's left-hand rule of current, flux density and force. Those forces are obtained from Lorentz force.

The force F is calculated from Equation (1) shown below, wherein the density of the current flowing through the flat coil 7 is denoted by i and the flux density of the magnetic induction induced by the upper and the lower permanent magnets is denoted by B.

$$F=i*B \tag{1}$$

Actually, the force depends on a wire turn number n and a peripheral length w of the flat coil 7 whereon the force F works (as shown in FIG. 17) so that Equation (1) turns to Equation (2).

$$F=n*w*(i*B) \tag{2}$$

On the other hand, the torsion bars 6 are twisted by the rotation of the movable plate 5, which generates a recoiling F' of the torsion bars 6 acting as a spring. A relationship between the displacement angle Phi of the movable plate 5 and the recoiling force F' is calculated from Equation (3) shown below.

$$Phi=(Mx/G*lp)=F'*(L/8.5E9*r^4)*l_1 \tag{3}$$

Herein Mx is a torsional moment, G is a lateral elastic coefficient and lp is a polar sectional secondary moment while L, $l_1$ and r are a distance from a central axis of the torsion bars 6 to a force applying point, a length of the torsion bars 6 and a radius of the torsion bars 6, respectively, as shown in FIG. 17.

The movable plate 5 rotates until aforementioned force F balances with the recoiling force F'. Accordingly, substituting F from Equation (2) into F' in Equation (3) clarifies that the displacement angle Phi is proportional to the current density i flowing through the flat coil 7.

Consequently, a control of the current density flowing through the flat coil 7 makes it possible to control the displacement angle Phi of the movable plate 5, namely, the displacement angle Phi of the mirror 8.

During controlling the displacement angle Phi of an optical axis of the mirror 8, an alternating current which detects the displacement angle and has at least a hundred-times higher frequency compared with that of the driving current is fed to flow through the flat coil 7, being superimposed on the driving current. Such a detection current generates the induction voltages in the detection coils 12A and 12B, respectively, formed on the lower glass substrate 4 due to the mutual inductances between the flat coil 7 and the coil 12A as well as between the flat coil 7 and the coil 12B. When the movable plate 5, namely, the mirror 8 is located on a horizontal position, a distance from the detecting coil 12A to the flat coil 7 is equal to another distance from another detecting coil 12B to the flat coil 7, which makes the induction voltages generated in the detecting coils 12A and 12B equal and makes a difference in between null. If aforementioned driving force rotates the movable plate 5 rendering the torsion bars 6 as the supporting axis, one of the detection coils 12A (or 12B) approaches the flat coil 7 to raise the induction voltage due to a rise in mutual inductance meanwhile another of detection coils 12B (or 12A) recedes from the flat coil 7 to reduce the induction voltage due to a reduction in mutual inductance. Consequently, the induction voltages generated in the detection coils 12A and 12B vary depending on the displacement angle Phi of the mirror 8. Measurement of above-mentioned induction voltages enables to detect the displacement angle Phi of the optical axis of the mirror 8.

Figure 18:
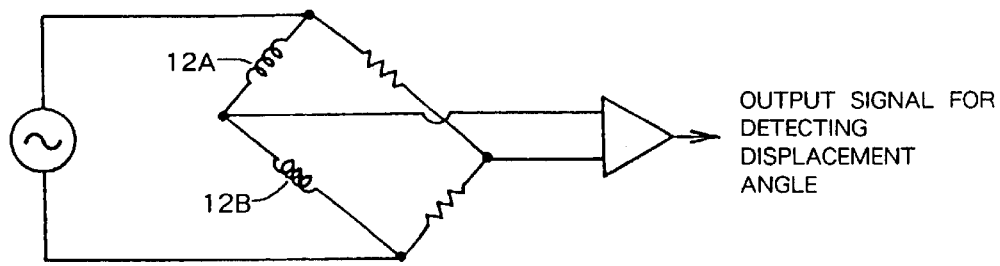
FIG. 18 is an illustration for detecting the displacement angle of the movable plate in the semiconductor mirror galvanometer.

A bridge circuit composed of, for instance, two resistors beside two detection coils 12A and 12B is supplied with a power supply as shown in FIG. 18. A potential difference between a neutral point of the detection coils 12A and 12B and another neutral point of two resistors is applied as an input signal to a differential amplifier. An output signal produced from the differential amplifier in response to the potential difference between aforementioned both neutral points is fed back to a system to control the driving current for driving the movable plate 5, which enables a precise control of the displacement angle Phi of the optical axis of the mirror 8. However, the detecting coils 12A and 12B are not utilized in the present embodiment.

A characteristic frequency $Omega_o$ for swinging which is inherent to the movable plate 5 is represented by a following equation though a detailed deviation is omitted:

$$Omega_o = (G * I_p / J * l_1)^{**\frac{1}{2}}$$

Herein J stands for a moment of inertia and $I_p$ stands for the polar sectional secondary moment, both of which are denoted by following equations:

$$J = [M(t^2 + L_1^2)]/12$$

$$I_p = 3.1415926 * r^4/32,$$

wherein M is a mass of the movable plate, t is a thickness of the movable plate, $L_1$ is a length of the movable plate and r is the radius of the torsion bars.

Industrial Utilizabilities

As mentioned above, the present invention can provide the optical barrier apparatus, of which manufacturing costs are reducible without endangering the fail-safe property.

What is claimed is:

1. An optical barrier apparatus, comprising:
   a generating means of a laser beam;
   a laser scanning means which reflects said laser beam generated from said generating means so that an area including a region to be inspected is scanned with said laser beam;
   a concave reflection mirror which reflects said laser beam incident from said laser scanning means through said area including said region to be inspected, such that the reflected beam is directed to a position spaced from said scanning means;
   a light receiving device spaced from said scanning means which receives said laser beam reflected from said concave reflection mirror to said position spaced from said scanning means and incident through said area including said region to be inspected; and
   a signal deficiency detecting means which detects a deficiency in an output signal produced from said light receiving device.

2. The optical beam barrier apparatus according to claim 1, further comprising:
   a light receiving device for confirming a scanning operation, which is provided inside said area including said region to be inspected and located outside said region to be inspected;
   a signal deficiency detecting means which detects a deficiency in an output signal produced from said light receiving device for confirming said scanning operation; and
   a means for blocking output signals generated from said optical beam barrier apparatus when said signal deficiency detecting means detects said deficiency in said output signal produced from said light receiving device.

3. The optical beam barrier apparatus according to claim 1, wherein:
   said laser scanning means is a semiconductor mirror galvanometer, comprising:
   a movable plate monolithically formed in a semiconductor substrate;
   a torsion bar monolithically formed in said semiconductor substrate which supports said movable plate axially on said substrate, allowing said movable plate freely to swing with respect to said semiconductor substrate;
   a driving coil provided on a periphery of said plate;
   a generating means of a magnetic field which applies a static magnetic field to said driving coil; and
   a mirror formed on said movable plate,
   wherein a current introduced to flow through said driving coil generates a force to move said movable plate in response to said force to vary an orienting direction of an optical axis of said mirror.

* * * * *